United States Patent
Balogh et al.

(10) Patent No.: US 10,227,460 B2
(45) Date of Patent: Mar. 12, 2019

(54) LIGNOCELLULOSE COMPOSITE PRODUCTS

(71) Applicant: Georgia-Pacific Chemicals LLC, Atlanta, GA (US)

(72) Inventors: Jeffrey Balogh, Covington, GA (US); Kim K. Tutin, East Point, GA (US); Anne M. Cothran, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 482 days.

(21) Appl. No.: 14/821,152

(22) Filed: Aug. 7, 2015

(65) Prior Publication Data

US 2016/0039981 A1 Feb. 11, 2016

Related U.S. Application Data

(60) Provisional application No. 62/034,264, filed on Aug. 7, 2014.

(51) Int. Cl.
| | |
|---|---|
| *C08J 5/06* | (2006.01) |
| *C08L 97/02* | (2006.01) |
| *C08J 5/04* | (2006.01) |
| *D21H 17/15* | (2006.01) |
| *D21H 17/62* | (2006.01) |
| *D21H 21/16* | (2006.01) |

(52) U.S. Cl.
CPC ........... *C08J 5/06* (2013.01); *C08J 5/045* (2013.01); *C08L 97/02* (2013.01); *D21H 17/15* (2013.01); *D21H 17/62* (2013.01); *D21H 21/16* (2013.01); *C08J 2361/00* (2013.01)

(58) Field of Classification Search
CPC ............... C08L 97/02; C08J 5/06; C08J 5/045
USPC ...................................... 524/13, 14
See application file for complete search history.

(56) References Cited

U.S. PATENT DOCUMENTS

| | | | |
|---|---|---|---|
| 3,943,117 A | 3/1976 | Force | |
| 4,075,188 A | 2/1978 | Vardell, Jr. | |
| 4,154,725 A | 5/1979 | Otrhalek et al. | |
| 4,238,304 A | 12/1980 | Zucker | |
| 4,308,200 A | 12/1981 | Fremont | |
| 4,495,095 A | 1/1985 | Lawsun et al. | |
| 4,524,024 A | 6/1985 | Hughes | |
| 5,132,399 A | 7/1992 | MacDonald et al. | |
| 5,164,480 A | 11/1992 | Huibers et al. | |
| 5,866,641 A * | 2/1999 | Ronden ............. | C08J 9/0023 521/54 |
| 6,420,034 B1 * | 7/2002 | Takahashi ......... | B27N 3/002 428/423.1 |
| 6,469,125 B1 | 10/2002 | Fontana et al. | |
| 8,133,408 B2 | 3/2012 | Swift et al. | |
| 2005/0268530 A1 | 12/2005 | Brewer et al. | |
| 2011/0165398 A1 | 7/2011 | Shoemake et al. | |
| 2013/0292864 A1 | 11/2013 | Breyer et al. | |
| 2014/0090577 A1 | 4/2014 | Sniady et al. | |
| 2014/0094562 A1 | 4/2014 | Hagiopol et al. | |
| 2014/0202647 A1 | 7/2014 | Hagiopol et al. | |
| 2014/0275360 A1 | 9/2014 | Williamson et al. | |
| 2014/0275361 A1 | 9/2014 | Williamson et al. | |
| 2015/0090157 A1 | 4/2015 | Sniady et al. | |

FOREIGN PATENT DOCUMENTS

| | | |
|---|---|---|
| CL | 2015002066 | 12/2015 |
| WO | 2013/060943 | 5/2013 |
| WO | 2014/114850 | 7/2014 |
| WO | 2014/116377 | 7/2014 |

* cited by examiner

*Primary Examiner* — Peter D. Mulcahy
(74) *Attorney, Agent, or Firm* — Edmonds & Cmaidalka, P.C.; Jared E. Cmaidalka; Ram W. Sabnis

(57) ABSTRACT

Lignocellulose composite products that include a hydrophobizing agent. The lignocellulose composite product can include a plurality of lignocellulose substrates, an at least partially cured binder composition, and a hydrophobizing agent. In one example, the hydrophobizing agent can include about 30 wt % to about 98 wt % of a fatty acid compound, about 0.1 wt % to about 15 wt % of a rosin acid compound, and about 1 wt % to about 40 wt % of an unsaponifiable compound. In another example, the hydrophobizing agent can include a tall oil pitch and a fatty acid composition.

20 Claims, No Drawings

LIGNOCELLULOSE COMPOSITE PRODUCTS

CROSS-REFERENCE TO RELATED APPLICATION

This application claims priority to U.S. Provisional Patent Application No. 62/034,264, filed on Aug. 7, 2014, which is incorporated by reference herein.

BACKGROUND

Field

Embodiments described generally relate to lignocellulose composite products that include one or more hydrophobizing agents. More particularly, such embodiments relate to lignocellulose composite products that include a hydrophobizing agent that includes a fatty acid compound, a rosin acid compound, and an unsaponifiable compound and/or a pitch and a fatty acid composition.

Description of the Related Art

A variety of lignocellulose composite products and other engineered materials are made by bonding a plurality of lignocellulose substrates into a unitary product containing the substrates and a binder or adhesive resin. Lignocellulose composite products have been used in a wide variety of applications and often exhibit superior properties as compared to solid wood products. For example, wood based composite products containing lignocellulose are generally stronger, usually exhibit better resistance to degradation and failure due to water or moisture exposure, and are often more cost-effective than solid wood products of similar dimensions. Generally, wood based composite products and solid wood products can become damaged if exposed to high humidity or water for a given period of time. Notably, these wood products can become swollen, warped, and/or deteriorate under various moisture exposure conditions.

Hydrophobizing agents can be coated onto the outer surfaces of the composite or solid wood products to help reduce or eliminate water penetration and absorption into the product and, therefore, helps to at least minimize if not prohibit swelling and warping of the product. Over time, however, the hydrophobizing agent can wear away from the outer surfaces of the product. The loss the hydrophobizing agent reduces the resistance or protection of the product against water.

There is a need, therefore, for improved lignocellulose composite products having improved resistance or protection against water.

SUMMARY

Lignocellulose composite products that include a hydrophobizing agent and methods for making and using same are provided. In at least one specific embodiment, the lignocellulose composite product can include a plurality of lignocellulose substrates; an at least partially cured binder composition; and a hydrophobizing agent. The hydrophobizing agent can include about 30 wt % to about 98 wt % of a fatty acid compound, about 0.1 wt % to about 15 wt % of a rosin acid compound, and about 1 wt % to about 40 wt % of an unsaponifiable compound.

In at least one other specific embodiment, the lignocellulose composite product can include a plurality of lignocellulose substrates; about 1 wt % to about 10 wt % of an at least partially cured binder composition, based on a dried weight of the plurality of lignocellulose; about 0.1 wt % to about 5 wt % of a hydrophobizing agent, based on a dried weight of the plurality of lignocellulose substrates; and less than 1 wt % of a slack wax, based on the dried weight of the lignocellulose composite products. The binder composition can include an at least partially cured melamine-formaldehyde resin, urea-formaldehyde resin, phenol-formaldehyde resin, melamine-urea-formaldehyde resin, phenol-melamine-urea-formaldehyde resin, resorcinol-formaldehyde resin, phenol-resorcinol formaldehyde resin, or any mixture thereof. The hydrophobizing agent can include about 30 wt % to about 98 wt % of a fatty acid compound, about 0.1 wt % to about 15 wt % of a rosin acid compound, and about 1 wt % to about 40 wt % of an unsaponifiable compound.

In at least one other specific embodiment, the lignocellulose composite product can include a plurality of lignocellulose substrates; an at least partially cured binder composition; and a hydrophobizing agent. The hydrophobizing agent can include a tall oil pitch and a fatty acid composition.

DETAILED DESCRIPTION

Embodiments described relate to lignocellulose composite products that can include one or more hydrophobizing agents, such as hydrophobized, lignocellulose composite products and methods for making and using same. The lignocellulose composite product can include a plurality of lignocellulose substrates, one or more at least partially cured binder compositions, and one or more hydrophobizing agents. The method for producing the lignocellulose composite product can include contacting or combining the plurality of lignocellulose substrates with the one or more hydrophobizing agents and the one or more binder compositions to produce a mixture. The binder composition in the mixture can be at least partially cured to produce the lignocellulose composite product. In one example, the hydrophobizing agent can include about 30 wt % to about 98 wt % of one or more fatty acid compounds, about 0.1 wt % to about 15 wt % of one or more rosin acid compounds, and about 1 wt % to about 40 wt % of one or more unsaponifiable compounds. In another example, the hydrophobizing agent can include a tall oil pitch and a fatty acid composition.

The amount of the hydrophobizing agent in the lignocellulose composite product can widely vary. For example, the lignocellulose composite product can include about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.2 wt %, about 3.4 wt %, about 3.6 wt %, about 3.8 wt %, about 4 wt %, about 4.2 wt %, about 4.4 wt %, about 4.6 wt %, about 4.8 wt %, or about 5 wt % to about 6 wt %, about 7 wt %, about 8 wt %, about 9 wt %, about 10 wt %, or about 12 wt % of the hydrophobizing agent, based on a dried weight of the lignocellulose substrates. In another example, the lignocellulose composite product can include about 0.05 wt % to about 12 wt %, about 0.1 wt % to about 4 wt %, about 0.1 wt % to about 5 wt %, about 0.1 wt % to about 12 wt %, about 0.1 wt % to about 10 wt %, about 0.1 wt % to about 8 wt %, about 0.1 wt % to about 6 wt %, about 0.2 wt % to about 10 wt %, about 0.3 wt % to about 8 wt %, about 0.5 wt % to about 1 wt %, about 0.5 wt % to about 2 wt %, about 0.5 wt % to about 3 wt %, about 0.5 wt % to about 4 wt %, about 0.5 wt % to about 5 wt %, about 0.5 wt % to about 5.5 wt %, about 0.5 wt % to about 6 wt %, about 0.5 wt % to about 8 wt %, about 0.5 wt % to about 10 wt %, about 0.6 wt % to about 4.5 wt %, about 0.6 wt % to about 4 wt %, about 0.7 wt % to about 3.5 wt %, about 0.8 wt % to about 3 wt %, about 0.9 wt % to about 2.5 wt %, about 1 wt % to about 2 wt %, about 1 wt % to about 3 wt %, about 1 wt % to about 4 wt %, about 1 wt % to about 5 wt %, about 1 wt % to about 6 wt %, about 1 wt % to about 8 wt %, about 1 wt % to about 10 wt % of the hydrophobizing agent, based on a dried weight of the lignocellulose substrates.

The hydrophobizing agent can be or include one or more tall oil based compositions. Illustrative tall oil based compositions can include, but are not limited to, fatty acids, tall oil fatty acids (TOFAs), tall oil rosin acids, high acid value (HAV) head compositions, low acid value (LAV) head compositions, pitch compositions, rosin compositions, acids thereof, acid esters thereof, acid glycerides thereof, acid salts thereof, or any mixture thereof. In some embodiments, the hydrophobizing agent can include stearic acid, stearates, stearic acid triglycerides, hydrogenated castor oil, glyceryl trihydroxystearate, 12-hydroxystearic acid triglyceride, castor wax, acids thereof, salts thereof, or any mixture thereof, with or without one or more components from a tall oil based composition.

The HAV head composition can have an acid value of about 150, about 155, about 160, about 165, about 170, or about 175 to about 180, about 185, about 190, about 195, or about 200. For example, the HAV head composition can have an acid value of about 150 to about 200, about 160 to about 190, or about 170 to about 180. The HAV head composition can have a softening point of about 30° C., about 32° C., about 35° C., about 38° C., about 40° C., about 42° C., about 45° C., about 48° C., about 50° C., about 52° C., about 55° C., about 58° C., or about 60° C. The HAV head composition can have a softening point of about 30° C. to about 60° C., about 35° C. to about 55° C., or about 40° C. to about 50° C. In at least one example, the hydrophobizing agent can include a HAV head composition, and the HAV head composition can have an acid value of about 150 to about 200 and a softening point of about 30° C. to about 60° C. or about 35° C. to about 55° C.

As used herein, an "acid value" is the mass of potassium hydroxide (KOH) in milligrams that is required to neutralize one gram of a given composition (mg KOH/g), e.g., the HAV composition. In a typical procedure, a known amount of a given composition is dissolved in an organic solvent and is titrated with a solution of potassium hydroxide of known concentration. The acid value can be determined by using a potassium hydroxide solution that contains phenolphthalein as a color indicator or using potentiometric analysis. Standard methods used for determining acid values can include ASTM D465-05(2010), AOCS Te 1a-64-64(09), and AOCS Da 14-48(09). As used herein, the "softening point" of a composition is s the temperature at which a material softens beyond some arbitrary softness. The softening points of the compositions discussed and described herein can be measured according to ASTM D6090-12.

The HAV head composition can include about 70 wt %, about 71 wt %, about 72 wt %, about 73 wt %, about 74 wt %, about 75 wt %, about 76 wt %, about 77 wt %, about 78 wt %, about 79 wt %, or about 80 wt % to about 81 wt %, about 82 wt %, about 83 wt %, about 84 wt %, about 85 wt %, about 86 wt %, about 87 wt %, about 88 wt %, about 89 wt %, about 90 wt %, about 92 wt %, about 93 wt %, about 94 wt %, or about 95 wt % of the one or more fatty acid compounds; about 0.5 wt %, about 0.6 wt %, about 0.7 wt %, about 0.8 wt %, about 0.9 wt %, about 1 wt %, about 1.2 wt %, about 1.4 wt %, about 1.6 wt %, about 1.8 wt %, about 2 wt %, about 2.2 wt %, or about 2.4 wt % to about 2.6 wt %, about 2.8 wt %, about 3 wt %, about 3.2 wt %, about 3.4 wt %, about 3.6 wt %, about 3.8 wt %, about 4 wt %, about 4.2 wt %, about 4.4 wt %, about 4.6 wt %, about 4.8 wt %, or about 5 wt % of the one or more rosin acid compounds; and about 2 wt %, about 3 wt %, about 4 wt %, about 5 wt %, about 6 wt %, about 7 wt %, about 8 wt %, about 9 wt %, or about 10 wt % to about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt % of one or more unsaponifiable compounds, based on the combined weight of the fatty acid compounds, the rosin acid compounds, and the unsaponifiable compounds.

In one example, the hydrophobizing agent can include an HAV head composition that can include about 70 wt % to about 95 wt % of the one or more fatty acid compounds, about 0.5 wt % to about 5 wt % of the one or more rosin acid compounds, and about 2 wt % to about 25 wt % of one or more unsaponifiable compounds, based on the combined weight of the fatty acid compounds, the rosin acid compounds, and the unsaponifiable compounds. In another example, the hydrophobizing agent can include an HAV head composition that can include about 75 wt % to about 90 wt % of the one or more fatty acid compounds, about 1 wt % to about 4 wt % of the one or more rosin acid compounds, and about 3 wt % to about 15 wt % of one or more unsaponifiable compounds, based on the combined weight of the fatty acid compounds, the rosin acid compounds, and the unsaponifiable compounds. In another example, the hydrophobizing agent can include an HAV head composition that can include about 80 wt % to about 85 wt % of the one or more fatty acid compounds, about 2 wt % to about 3 wt % of the one or more rosin acid compounds, and about 5 wt % to about 10 wt % of one or more unsaponifiable compounds, based on the combined weight of the fatty acid compounds, the rosin acid compounds, and the unsaponifiable compounds.

The LAV head composition can have an acid value of about 80, about 85, about 90, about 95, about 100, about 105, or about 110 to about 115, about 120, about 125, about 130, about 135, about 140, about 145, or about 150. For example, the LAV head composition can have an acid value of about 80, about 85, about 90, about 95, about 100, about 105, or about 110 and less than 115, less than 120, less than 125, less than 130, less than 135, less than 140, less than 145, or less than 150. In some examples, the LAV head composition can have an acid value of about 80 to about 150, about 80 and less than 150, about 90 to about 140, or about 100 to about 130. The LAV head composition can have a softening point of about 30° C., about 32° C., about 35° C., about 38° C., about 40° C., about 42° C., or about 45° C. to about 48° C., about 50° C., about 52° C., about 55° C., about 58° C., or about 60° C. In some examples, the LAV head composition can have a softening point of about 30° C. to about 60° C., about 35° C. to about 55° C., or about 40° C. to about 50° C. In some specific examples, the hydrophobizing agent can include the LAV head composition, and the LAV head composition can have an acid value of about 80 to less than 150 and a softening point of about 30° C. to about 60° C. or about 35° C. to about 55° C.

In some examples, the hydrophobizing agent can be or include an LAV head composition that can include about 30 wt %, about 32 wt %, about 35 wt %, about 37 wt %, about 40 wt %, about 42 wt %, about 45 wt %, about 47 wt %, or about 50 wt % to about 52 wt %, about 55 wt %, about 57 wt %, about 60 wt %, about 62 wt %, about 65 wt %, about 67 wt %, about 70 wt %, about 72 wt %, about 75 wt %, about 77 wt %, about 80 wt %, about 82 wt %, about 85 wt %, about 87 wt %, or about 90 wt % of the one or more fatty acid compounds; about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, or about 5 wt % to about 5.5 wt %, about 6 wt %, about 6.5 wt %, about 7 wt %, about 7.5 wt %, about 8 wt %, about 8.5 wt %, about 9 wt %, about 9.5 wt %, about 10 wt % of the one or more rosin acid compounds; and about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt % to about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, or about 35 wt % of one or more unsaponifiable compounds, based on the combined weight of the fatty acid compounds, the rosin acid compounds, and the unsaponifiable compounds.

In one example, the hydrophobizing agent can include an LAV head composition that can include about 30 wt % to about 90 wt % of the one or more fatty acid compounds, about 0.2 wt % to about 10 wt % of the one or more rosin acid compounds, and about 5 wt % to about 35 wt % of one or more unsaponifiable compounds, based on the combined weight of the fatty acid compounds, the rosin acid compounds, and the unsaponifiable compounds. In another example, the LAV head composition in the hydrophobizing agent can include about 50 wt % to about 75 wt % of the one or more fatty acid compounds, about 0.5 wt % to about 5 wt % of the one or more rosin acid compounds, and about 10 wt % to about 25 wt % of one or more unsaponifiable compounds, based on the combined weight of the fatty acid compounds, the rosin acid compounds, and the unsaponifiable compounds. In another example, the LAV head composition in the hydrophobizing agent can include about 60 wt % to about 65 wt % of the one or more fatty acid compounds, about 1 wt % to about 2 wt % of the one or more rosin acid compounds, and about 15 wt % to about 20 wt % of one or more unsaponifiable compounds, based on the combined weight of the fatty acid compounds, the rosin acid compounds, and the unsaponifiable compounds.

The fatty acids in the hydrophobizing agent can include fatty acids, fatty acid esters, fatty acid glycerides, fatty acid salts, tall oil fatty acids, tall oil fatty acid esters, tall oil fatty acid glycerides, tall oil fatty acid salts, or any mixture thereof. For example, as a source of fatty acids, the hydrophobizing agent can be or include one or more TOFAs, HAV head compositions, LAV head compositions, pitch compositions, rosin compositions, acids thereof, acid esters thereof, acid glycerides thereof, acid salts thereof, or any mixture thereof. In some examples, the hydrophobizing agent can include one, two, three, four, five, six, or more fatty acid compounds, such as palmitic acid, oleic acid, linoleic acid, stearic acid, capric acid, lauric acid, myristic acid, acids thereof, acid esters thereof, acid glycerides thereof, salts thereof, or any mixture thereof.

In some examples, the hydrophobizing agent can have varying concentrations of fatty acid compounds, such as palmitic acid, oleic acid, linoleic acid, stearic acid, esters thereof, glycerides thereof, salts thereof, or any mixture thereof, based on the weight of the hydrophobizing agent. For example, the hydrophobizing agent can include about 10 wt %, about 15 wt %, about 20 wt %, about 25 wt %, about 30 wt %, about 35 wt %, about 40 wt %, about 45 wt %, or about 50 wt % to about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, about 99 wt %, about 99.5 wt %, or about 100 wt % of the one or more fatty acid compounds, esters thereof, glycerides thereof, salts thereof, or any mixture thereof, based on the weight of the hydrophobizing agent. In some examples, the hydrophobizing agent can include about 20 wt % to about 99.5 wt %, about 25 wt % to about 99 wt %, about 30 wt % to about 98 wt %, about 35 wt % to about 98 wt %, about 40 wt % to about 98 wt %, about 45 wt % to about 97 wt %, about 50 wt % to about 95 wt %, about 55 wt % to about 95 wt %, about 60 wt % to about 95 wt %, about 65 wt % to about 95 wt %, or about 70 wt % to about 95 wt % of the one or more fatty acid compounds, esters thereof, glycerides thereof, salts thereof, or any mixture thereof, based on the weight of the hydrophobizing agent.

In some examples, the one or more fatty acid compounds in the hydrophobizing agent can include about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 15 wt %, about 20 wt %, about 25 wt %, about 30 wt %, about 35 wt %, about 40 wt %, about 45 wt %, or about 50 wt % to about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, or about 99 wt % of palmitic acid, palmitic acid esters, palmitic acid glycerides, palmitate or palmitic acid salts, or any mixture thereof, based on the weight of the hydrophobizing agent. In some examples, the one or more fatty acid compounds in the hydrophobizing agent can include about 40 wt % to about 98 wt %, about 45 wt % to about 97 wt %, about 50 wt % to about 95 wt %, about 55 wt % to about 90 wt %, about 60 wt % to about 85 wt %, about 65 wt % to about 80 wt %, or about 70 wt % to about 75 wt % of palmitic acid, palmitic acid esters, palmitic acid glycerides, palmitate or palmitic acid salts, or any mixture thereof, based on the weight of the hydrophobizing agent.

In some examples, the one or more fatty acid compounds in the hydrophobizing agent can include about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 22 wt %, about 24 wt %, about 26 wt %, about 28 wt %, about 30 wt %, about 35 wt %, about 40 wt %, about 45 wt %, or about 50 wt % to about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, or about 99 wt % of oleic acid, oleic acid esters, oleic acid glycerides, oleate or oleic acid salts, or any mixture thereof, based on the weight of the hydrophobizing agent. In some examples, the one or more fatty acid compounds in the hydrophobizing agent can include about 1 wt % to about 30 wt %, about 2 wt % to about 28 wt %, about 2 wt % to about 26 wt %, about 3 wt % to about 24 wt %, about 4 wt % to about 22 wt %, about 5 wt % to about 20 wt %, about 6 wt % to about 18 wt %, about 7 wt % to about 16 wt %, about 7 wt % to about 14 wt %, about 8 wt % to about 12 wt %, or about 9 wt % to about 11 wt % of oleic acid, oleic acid esters, oleic acid glycerides, oleate or oleic acid salts, or any mixture thereof, based on the weight of the hydrophobizing agent.

In some examples, the one or more fatty acid compounds in the hydrophobizing agent can include about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 22 wt %, about 24 wt %, about 26 wt %, about 28 wt %, about 30 wt %, about 35 wt %, about 40 wt %, about 45 wt %, or about 50 wt % to about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, or about 99 wt % of linoleic acid, linoleic acid esters, linoleic acid glycerides, linoleate or linoleic acid salts, or any mixture thereof, based on the weight of the hydrophobizing agent. In some examples, the one or more fatty acid compounds in the hydrophobizing agent can include about 0.05 wt % to about 20 wt %, about 0.1 wt % to about 15 wt %, about 0.1 wt % to about 12 wt %, about 0.1 wt % to about 10 wt %, about 0.1 wt % to about 9 wt %, about 0.1 wt % to about 8 wt %, about 0.1 wt % to about 7 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 3 wt % to about 8 wt %, about 3 wt % to about 7 wt %, about 4 wt % to about 7 wt %, about 4 wt % to about 6 wt %, or about 5 wt % to about 6 wt % of linoleic acid, linoleic acid esters, linoleic acid glycerides, linoleate or linoleic acid salts, or any mixture thereof, based on the weight of the hydrophobizing agent.

In some examples, the one or more fatty acid compounds in the hydrophobizing agent can include about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 22 wt %, about 24 wt %, about 26 wt %, about 28 wt %, about 30 wt %, about 35 wt %, about 40 wt %, about 45 wt %, about 50 wt % to about 55 wt %, about 60 wt %, about 65 wt %, about 70 wt %, about 75 wt %, about 80 wt %, about 85 wt %, about 90 wt %, about 95 wt %, about 96 wt %, about 97 wt %, about 98 wt %, about 99 wt % of stearic acid, stearic acid esters, stearic acid glycerides, stearate or stearic acid salts, or any mixture thereof, based on the weight of the hydrophobizing agent. In some examples, the one or more fatty acid compounds in the hydrophobizing agent can include about 0.05 wt % to about 20 wt %, about 0.1 wt % to about 15 wt %, about 0.1 wt % to about 12 wt %, about 0.1 wt % to about 10 wt %, about 0.1 wt % to about 9 wt %, about 0.1 wt % to about 8 wt %, about 0.1 wt % to about 7 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.5 wt % to about 10 wt %, about 0.5 wt % to about 9 wt %, about 0.5 wt % to about 8 wt %, about 0.5 wt % to about 7 wt %, about 0.5 wt % to about 6 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, or about 1 wt % to about 2 wt % of stearic acid, stearic acid esters, stearic acid glycerides, stearate or stearic acid salts, or any mixture thereof, based on the weight of the hydrophobizing agent.

In one example, the one or more fatty acid compounds in the hydrophobizing agent can include about 60 wt % to about 85 wt % of palmitic acid, palmitic acid esters, palmitic acid glycerides, palmitate or palmitic acid salts, or any mixture thereof, about 5 wt % to about 20 wt % of oleic acid, oleic acid esters, oleic acid glycerides, oleate or oleic acid salts, or any mixture thereof, about 1 wt % to about 10 wt % of linoleic acid, linoleic acid esters, linoleic acid glycerides, linoleate or linoleic acid salts, or any mixture thereof, and about 0.1 wt % to about 8 wt % of stearic acid, stearic acid esters, stearic acid glycerides, stearate or stearic acid salts, or any mixture thereof, based on the weight of the hydrophobizing agent. In another example, the one or more fatty acid compounds in the hydrophobizing agent can include about 65 wt % to about 80 wt % of palmitic acid, palmitic acid esters, palmitic acid glycerides, palmitate or palmitic acid salts, or any mixture thereof, about 8 wt % to about 12 wt % of oleic acid, oleic acid esters, oleic acid glycerides, oleate or oleic acid salts, or any mixture thereof, about 3 wt % to about 7 wt % of linoleic acid, linoleic acid esters, linoleic acid glycerides, linoleate or linoleic acid salts, or any mixture thereof, and about 0.5 wt % to about 5 wt % of stearic acid, stearic acid esters, stearic acid glycerides, stearate or stearic acid salts, or any mixture thereof, based on the weight of the hydrophobizing agent. In another example, the one or more fatty acid compounds in the hydrophobizing agent can include about 70 wt % to about 75 wt % of palmitic acid, palmitic acid esters, palmitic acid glycerides, palmitate or palmitic acid salts, or any mixture thereof, about 9 wt % to about 11 wt % of oleic acid, oleic acid esters, oleic acid glycerides, oleate or oleic acid salts, or any mixture thereof, about 5 wt % to about 6 wt % of linoleic acid, linoleic acid esters, linoleic acid glycerides, linoleate or linoleic acid salts, or any mixture thereof, and about 0.5 wt % to about 3 wt % of stearic acid, stearic acid esters, stearic acid glycerides, stearate or stearic acid salts, or any mixture thereof, based on the weight of the hydrophobizing agent.

The rosin acid compounds in the hydrophobizing agent can be or include one or more rosin acid esters, rosin acid glycerides, rosin acid salts, tall oil rosin acids, tall oil rosin acid esters, tall oil rosin acid glycerides, tall oil rosin acid salts, or any mixture thereof. For example, as a source of rosin acids, the hydrophobizing agent can be or include one or more HAV head compositions, LAV head compositions, pitch compositions, tall oil rosin acids and rosin compositions, acids thereof, acid esters thereof, acid glycerides thereof, acid salts thereof, or any mixture thereof. In some examples, the hydrophobizing agent can include one, two, or more rosin acid compounds, such as abietic acid, an abietic-type acid, pimaric acid, a pimaric-type acid, acids thereof, acid esters thereof, acid glycerides thereof, isomers thereof, salts thereof, or any mixture thereof.

In some embodiments, the hydrophobizing agent can have varying concentrations of rosin acids, such as abietic acid, an abietic-type acid, pimaric acid, a pimaric-type acid, esters thereof, glycerides thereof, isomers thereof, salts thereof, or any mixture thereof, based on the weight of the hydrophobizing agent. For example, the hydrophobizing agent can include about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, about 4.2 wt %, about 4.4 wt %, about 4.6 wt %, about 4.8 wt %, about 5 wt %, about 6 wt %, about 6.5 wt %, about 7 wt %, about 7.5 wt %, about 8 wt %, about 8.5 wt %, about 9 wt %, about 9.5 wt %, or about 10 wt % to about 10.5 wt %, about 11 wt %, about 11.5 wt %, about 12 wt %, about 12.5 wt %, about 13 wt %, about 13.5 wt %, about 14 wt %, about 14.5 wt %, about 15 wt %, about 16 wt %, about 17 wt %, about 18 wt %, about 19 wt %, about 20 wt %, or about 25 wt % of the one or more rosin acid compounds, acids thereof, esters thereof, glycerides thereof, salts thereof, or any mixture thereof, based on the weight of the hydrophobizing agent. In another example, the hydrophobizing agent can include about 0.01 wt % to about 25 wt %, about 0.5 wt % to about 20 wt %, about 0.1 wt % to about 15 wt %, about 0.1 wt % to about 12 wt %, about 0.1 wt % to about 10 wt %, about 0.1 wt % to about 8 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1 wt %, about 1 wt % to about 5 wt %, about 1 wt % to about 4 wt %, about 1 wt % to about 3 wt %, or about 1 wt % to about 2 wt % of the one or more rosin acid compounds, acids thereof, esters thereof, glycerides thereof, salts thereof, or any mixture thereof, based on the weight of the hydrophobizing agent.

In some examples, the one or more rosin acid compounds in the hydrophobizing agent can include about 0.1 wt %, about 0.2 wt %, about 0.4 wt %, about 0.6 wt %, about 0.8 wt %, about 1 wt %, about 1.2 wt %, about 1.4 wt %, about 1.6 wt %, about 1.8 wt %, about 2 wt %, about 2.5 wt %, about 3 wt %, about 3.5 wt %, about 4 wt %, about 4.5 wt %, about 5 wt %, about 5.5 wt %, or about 6 wt % to about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, or about 15 wt % of abietic acid, an abietic-type acid or an abietic acid derivative, pimaric acid, a pimaric-type acid or a pimaric acid derivative, acids thereof, acid esters thereof, acid glycerides thereof, isomers thereof, salts thereof, or any mixture thereof, based on the weight of the hydrophobizing agent. In some examples, the one or more rosin acid compounds in the hydrophobizing agent can include about 0.5 wt % to about 20 wt %, about 0.1 wt % to about 15 wt %, about 0.1 wt % to about 12 wt %, about 0.1 wt % to about 10 wt %, about 0.1 wt % to about 8 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, or about 0.1 wt % to about 1 wt % of abietic acid, an abietic-type acid, pimaric acid, a pimaric-type acid, acids thereof, acid esters thereof, acid glycerides thereof, isomers thereof, salts thereof, or any mixture thereof, based on the weight of the hydrophobizing agent.

As used herein, the term "unsaponifiable compound" refers to neutral material that generally includes hydrocarbons, sterols, high-molecular weight alcohols, other alkyl chain materials, or any mixture thereof that cannot be saponified. For example, as a source of unsaponifiable compounds for the hydrophobizing agent can be or include one or more HAV head compositions, LAV head compositions, pitch compositions, rosin compositions, acids thereof, acid esters thereof, acid glycerides thereof, acid salts thereof, or any mixture thereof. In some examples, the hydrophobizing agent can include one, two, three, four, five, six, or more unsaponifiable compounds. Also, the hydrophobizing agent can have varying concentrations of the unsaponifiable compounds. For example, the hydrophobizing agent can include about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 12 wt %, about 15 wt %, about 18 wt %, about 20 wt %, about 22 wt %, about 24 wt %, about 26 wt %, about 28 wt %, about 30 wt % to about 32 wt %, about 34 wt %, about 36 wt %, about 38 wt %, about 40 wt %, about 42 wt %, about 44 wt %, about 46 wt %, about 48 wt %, about 50 wt %, about 55 wt %, or about 60 wt % of one or more unsaponifiable compounds, based on the weight of the hydrophobizing agent.

In some examples, the hydrophobizing agent can include about 0.5 wt % to about 50 wt %, about 0.5 wt % to about 40 wt %, about 1 wt % to about 40 wt %, about 1 wt % to about 35 wt %, about 1 wt % to about 30 wt %, about 1 wt % to about 25 wt %, about 1 wt % to about 20 wt %, about 1 wt % to about 15 wt %, about 1 wt % to about 10 wt %, about 1 wt % to about 5 wt %, about 2 wt % to about 40 wt %, about 2 wt % to about 30 wt %, about 2 wt % to about 20 wt %, about 2 wt % to about 20 wt %, about 4 wt % to about 20 wt %, about 5 wt % to about 20 wt %, about 5 wt % to about 15 wt %, about 5 wt % to about 10 wt %, about 10 wt % to about 20 wt %, or about 15 wt % to about 20 wt % of one or more unsaponifiable compounds, based on the weight of the hydrophobizing agent. In some examples, the hydrophobizing agent can include unsaponifiable compounds derived from a HAV composition and have a concentration of about 5 wt % to about 10 wt %, of one or more unsaponifiable compounds, based on the weight of the hydrophobizing agent. In some examples, the hydrophobizing agent can include unsaponifiable compounds derived from a HAV composition and have a concentration of about 15 wt % to about 20 wt %, of one or more unsaponifiable compounds, based on the weight of the hydrophobizing agent.

Suitable pitch compositions that can be used as the hydrophobizing agent can be or include tall oil pitch that can be separated from crude tall oil. The pitch composition can be mixed, blended, or otherwise combined with one or more fatty acid compositions, e.g., tall oil fatty acid compositions, to produce a pitch emulsion or pitch dispersion. Tall oil pitch is a known material of commerce. The CAS number for tall oil pitch is 8016-81-7. Illustrative fatty acid compositions that can be mixed, blended, or otherwise combined with the pitch to produce the pitch emulsion or dispersion can include, but are not limited to, heads or lights, fatty acids or tall oil fatty acids (TOFA), distilled tall oil (DTO), rosin acids or rosins (tall oil rosins), or any mixture thereof. Suitable emulsifier or dispersion agents can include, but are not limited to, XTOL® 100 Tall Oil Fatty Acid, XTOL® 101 Tall oil Fatty acid, XTOL® 304 Tall Oil Fatty Acid, all available from Georgia-Pacific Chemicals LLC.

The precise composition of tall oil pitch can depend, at least in part, on the particular process by which the tall oil pitch is isolated and/or the particular source(s) of wood from which the crude tall oil is produced. At room temperature, tall oil pitch is a semi-solid, tar-like material. Tall oil pitch is a hydrophobic material. The tall oil pitch can include, but is not limited to, fatty acids, rosin or rosin acids, and unsaponifiable compounds.

The tall oil pitch can have a concentration of fatty acids of about 5 wt %, about 7 wt %, or about 9 wt % to a high of about 20 wt %, about 30 wt %, about 40 wt %, about 50 wt %, or about 55 wt %. The tall oil pitch can have a concentration of rosin acids of about 5 wt %, about 7 wt %, or about 9 wt % to a high of about 20 wt %, about 25 wt %, about 30 wt %, or about 35 wt %. The tall oil pitch can have a concentration of unsaponifiable compounds of about 30 wt %, about 40 wt %, or about 50 wt % to a high of about 70 wt %, about 80 wt %, or about 90 wt %. Dimerized rosin and dimerized fatty acid also can also be found in tall oil pitch. The tall oil pitch can have a moisture or water content of less than 1 wt %, less than 0.5 wt %, less than 0.1 wt %, or less than 0.05 wt %.

The tall oil pitch can have an acid value ranging from a low of about 20, about 25, or about 30 to a high of about 40, about 45, or about 50. The tall oil pitch can have a viscosity (centipoise at 85° C.) ranging from a low of about 20 centipoise (cP), about 40 cP, or about 60 cP to a high of about 110 cP, about 130 cP, or about 150 cP. The tall oil pitch can have a density ranging from a low of about 900 g/L, about 910 g/L, or about 920 g/L to a high of about 940 g/L, about 950 g/L, or about 960 g/L. The tall oil pitch can have a softening temperature ranging from a low of about 15° C., about 20° C., or about 25° C. to a high of about 40° C., about 50° C., or about 60° C. The tall oil pitch can have an energy or heating value of about 10,000 BTU/lb, about 12,000 BTU/lb, about 14,000 BTU/lb, or about 16,000 BTU/lb to about 18,000 BTU/lb, about 20,000 BTU/lb, about 22,000 BTU/lb, or about 25,000 BTU/lb.

Suitable tall oil pitches are commercially available from a variety of sources including Georgia-Pacific Chemicals LLC, e.g., XTOL® Tall Oil Pitch. Typical properties of XTOL® Tall Oil Pitch include a viscosity of about 450 cps at a temperature of 85° C., a concentration of rosin acids of about 9 wt %, a concentration of fatty acids of about 9 wt %, an acid value of 35 mg KOH/g, and an energy value of about 17,000 BTU/lb.

Another suitable pitch can include coal tar pitch, which is a byproduct of coke production and coal gasification. Coal tar pitch is a mixture containing polycyclic aromatic hydrocarbons and heterocyclic compounds. Another suitable pitch can include one or more asphalts (bitumens), which is a sticky, black, and highly viscous liquid or semi-solid that is present in most crude petroleums and in some natural deposits sometimes termed asphaltum. Asphalt (bitumen) pitch is also commercially available from a wide range of sources. Other suitable sources of pitch can include heavy crude oil, heavy petroleum distillates, and tar-like, low volatility Fischer-Tropsch products. As such, the pitch can be or include tall oil pitch, coal tar pitch, heavy crude oil, heavy petroleum distillates, Fischer-Tropsch products, asphalt (bitumen), or any combination or mixture thereof.

Suitable compositions that can be mixed, blended, or otherwise combined with the one or more pitches to produce the pitch emulsion and/or dispersion can include, but are not limited to, of fatty acids and/or rosins can include DTO, TOFA, tall oil rosins, or any combination thereof, derived from crude tall oil, such as by the distillation of crude tall oil. In another example, the fatty acids and/or rosins can be provided in the form of crude tall oil. In other words, the fatty acids and/or rosins can be used as present in crude tall oil. The fatty acids and/or rosins can also be or include crude tall oil and a combination of one or more products derived from crude tall oil.

An intermediate fraction that can be produced from the distillation of crude tall oil and can include a mixture of various components can be DTO. For example, distilled tall oil can include a mixture of fatty acids, fatty acid esters, rosins, rosin esters, and/or unsaponifiable compounds. The distilled tall oil can have a fatty acids and esters of fatty acids concentration of about 55 wt %, about 60 wt %, or about 65 wt % to about 85 wt %, about 90 wt %, or about 95 wt %. The distilled tall oil can have a rosin acids or rosins concentration of about 1 wt %, about 5 wt %, about 10 wt %, or about 15 wt % to about 30 wt %, about 35 wt %, or about 40 wt %. The distilled tall oil can have an unsaponifiable compounds concentration of about 0.1 wt %, about 1 wt %, or about 1.5 wt % to about 2 wt %, about 3.5 wt %, or about 5 wt %.

The distilled tall oil can have an acid value ranging from a low of about 20, about 25, or about 30 to a high of about 40, about 45, or about 50. The distilled tall oil can have a viscosity (centipoise at 85° C.) ranging from a low of about 10 cP, about 20 cP, about 30 cP, or about 40 cP to a high of about 100 cP, about 120 cP, about 135 cP, or about 150 cP. The distilled tall oil can have a density ranging from a low of about 840 g/L, about 860 g/L, or about 880 g/L to a high of about 900 g/L, about 920 g/L, or about 935 g/L. The distilled tall oil can have a saponification number ranging from a low of about 180, about 185, or about 190 to a high of about 200, about 205, or about 210. The distilled tall oil can have an iodine value ranging from a low of about 115, about 117, or about 120 to a high of about 130, about 135, or about 140.

Another intermediate fraction that can be produced from the distillation of crude tall oil can include rosin acids derived from crude tall oil (tall oil rosin). The tall oil rosin can have a concentration of rosin acids of about 80 wt %, about 85 wt %, or about 90 wt % to about 93 wt %, about 95 wt %, or about 99 wt %. Illustrative rosin acids can include, but are not limited to, abietic acid, dehydroabietic acid, isopimaric acid and pimaric acid. For example, the tall oil rosin can have a concentration of abietic acid of about 35 wt %, about 40 wt %, or about 43 wt % to about 50 wt %, about 55 wt %, or about 60 wt %. The tall oil rosin can have a concentration of dehydroabietic acid of about 10 wt %, about 13 wt %, or about 15 wt % to about 20 wt %, about 23 wt %, or about 25 wt %. The tall oil rosin can have a concentration of isopimaric acid of about 10 wt % or less, about 8 wt % or less, about 5 wt % or less, or about 3 wt % or less. The tall oil rosin can have a concentration of pimaric acid of about 10 wt % or less, about 8 wt % or less, about 5 wt % or less, or about 3 wt % or less. The tall oil rosins can have a fatty acids concentration of about 0.5 wt %, about 1 wt %, or about 2 wt % to about 3 wt %, about 5 wt %, or about 10 wt %. The tall oil rosin can have a concentration of unsaponifiable compounds of about 0.5 wt %, about 1 wt %, or about 2 wt % to about 3 wt %, about 5 wt %, or about 10 wt %. The tall oil rosin can have a density of about 960 g/L, about 970 g/L, or about 980 g/L to about 1,000 g/L, about 1,010 g/L, or about 1,020 g/L. The tall oil rosin can have an acid value ranging from a low of about 150, about 160, or about 165 to a high of about 170, about 175, or about 180.

Another intermediate fraction that can be produced from the distillation of crude tall oil and can include a mixture of various fatty acids, fatty acid esters, and minor amounts of rosin, rosin esters, and/or unsaponifiable compounds can include TOFA. The TOFA can have an oleic acid concentration of about 30 wt %, about 35 wt %, or about 40 wt % to about 45 wt %, about 50 wt %, or about 55 wt %. The TOFA can have a linoleic acid concentration of about 30 wt %, about 35 wt %, or about 40 wt % to about 45 wt %, about 50 wt %, or about 55 wt %. TOFA can have a concentration of stearic acid of about 0.5 wt %, about 1 wt %, or about 1.5 wt % to about 2 wt %, about 3 wt %, or about 5 wt %. The TOFA can have a concentration of conjugated linoleic acid of about 0.5 wt %, about 1 wt %, or about 1.5 wt % to about 2 wt %, about 3 wt %, or about 5 wt %. The TOFA can have a combined concentration of palmitic acid, linolenic acid, and palmitoleic acid of about 0.5 wt %, about 1 wt %, or about 1.5 wt % to about 2 wt %, about 3 wt %, or about 5 wt %. The TOFA can have a concentration of rosins of less than 5 wt %, less than 3 wt %, less than 2 wt %, less than 1 wt %, or less than 0.5 wt %. In one example, the TOFA can have a concentration of unsaponifiable compounds of less than 5 wt %, less than 3 wt %, less than 2 wt %, less than about 1 wt %, or less than 0.5 wt %. In at least one example, the TOFA can include about 55 wt % to about 95 wt % of fatty acids, about 1 wt % to about 45 wt % of rosin acids, and less than 5 wt % of unsaponifiable compounds, based on a combined weight of the fatty acids, the rosin acids, and the unsaponifiable compounds.

The TOFA can have an acid value of about 180, about 190, or about 195 to about 200, about 205, or about 210. The tall oil fatty acids can have a density of about 840 g/L, about 860 g/L, or about 880 g/L to about 920 g/L, about 940 g/L, or about 960 g/L. The TOFA can have a saponification number of about 190 to about 210. The TOFA can have an iodine value of about 120 to about 135.

Suitable products derived from crude tall oil (CTO) are commercially available from a variety of sources including Georgia-Pacific Chemicals LLC. Representative DTO, TOFA, and/or tall oil rosin products can include, but are not limited to, XTOL® 100, XTOL® 101, XTOL® 300, XTOL® 304, XTOL® 520, XTOL® 530, XTOL® 540, XTOL® 542, XTOL® 656, XTOL® 690, XTOL® 692, XTOL® MTO, LYTOR® 100, LYTOR® 105, LYTOR® 105K, LYTOR® 110 and LYTOR® 307.

Suitable processes for producing tall oil pitch, DTO, TOFA, tall oil rosin, and other products derived from crude tall oil can include those discussed and described in U.S. Pat. Nos. 3,943,117; 4,075,188; 4,154,725; 4,238,304; 4,308,200; 4,495,095; 4,524,024; 5,132,399; 5,164,480; 6,469,125; and 8,133,408 and U.S. Patent Application Publication No. 2005/0268530. It also is understood by those skilled in the art that because crude tall oil, and, as such, tall oil pitch, DTO, TOFA, tall oil rosins, and other crude tall oil derived products are derived from natural sources, the compositions can vary among the various sources.

The pitch emulsion can include about 40 wt %, about 45 wt %, about 50 wt %, about 55 wt %, or about 60 wt % to about 70 wt %, about 80 wt %, about 90 wt %, or about 95 wt % of the tall oil pitch, based on a combined weight of the tall oil pitch and the fatty acid composition. For example, the pitch emulsion can include about 60 wt % to about 90 wt %, about 70 wt % to about 80 wt %, about 65 wt % to about 85 wt %, about 55 w % to about 80 wt %, or about 70 wt % to about 90 wt % of the tall oil pitch, based on the combined weight of the tall oil pitch and the fatty acid composition. In another example, the pitch emulsion can include at least 60 wt %, at least 63 wt %, at least 65 wt %, at least 67 wt %, at least 70 wt %, at least 73 wt %, or at least 75 wt % to about 77 wt %, about 80 wt %, about 83 wt %, about 85 wt %, about 87 wt %, about 90 wt %, about 93 wt %, or about 95 wt % of the tall oil pitch, based on the combined weight of the tall oil pitch and the fatty acid composition. The fatty acid composition in the pitch emulsion can be or include tall oil fatty acids (TOFA), distilled tall oil fatty acids (DTO), crude tall oil (CTO), or any mixture thereof.

The lignocellulose composite product and/or the hydrophobizing agent can be substantially free of, or essentially free of, or completely free of slack wax, paraffin wax, or other waxes. In other embodiments, the hydrophobizing agent and/or the lignocellulose composite product can include one or more slack waxes, paraffin waxes, other waxes, or any mixture thereof. For example, the hydrophobizing agent can be or include about 5 wt % to about 95 wt %, about 10 wt % to about 90 wt %, about 15 wt % to about 85 wt %, about 20 wt % to about 80 wt %, about 25 wt % to about 75 wt %, about 30 wt % to about 70 wt %, about 35 wt % to about 65 wt %, about 40 wt % to about 60 wt %, about 45 wt % to about 55 wt %, or about 50 wt % of the slack waxes, based on the weight of the hydrophobizing agent. The lignocellulose composite product can include about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt % of one or more slack waxes, paraffin waxes, other waxes, based on a dried weight of the lignocellulose substrates. The lignocellulose composite product can include less than 5 wt %, less than 4 wt %, less than 3 wt %, less than 2.5 wt %, less than 2 wt %, less than 1.5 wt %, less than 1 wt %, less than 0.7 wt %, less than 0.5 wt %, less than 0.3 wt %, less than 0.1 wt %, or less than 0.05 wt % of slack wax, based on a dried weight of the lignocellulose substrates.

In some examples, the lignocellulose composite product can include about 0.05 wt % to about 20 wt %, about 0.05 wt % to about 15 wt %, about 0.05 wt % to about 10 wt %, about 0.05 wt % to about 8 wt %, about 0.05 wt % to about 6 wt %, about 0.05 wt % to about 5 wt %, about 0.05 wt % to about 4 wt %, about 0.05 wt % to about 3 wt %, about 0.05 wt % to about 2 wt %, or about 0.05 wt % to about 1 wt % of one or more slack waxes, paraffin waxes, other waxes, based on a dried weight of the lignocellulose substrates. In other examples, the lignocellulose composite product can include about 0.1 wt % to about 15 wt %, about 0.1 wt % to about 12 wt %, about 0.1 wt % to about 10 wt %, about 0.1 wt % to about 9 wt %, about 0.1 wt % to about 8 wt %, about 0.1 wt % to about 7 wt %, about 0.1 wt % to about 6 wt %, about 0.1 wt % to about 5 wt %, about 0.1 wt % to about 4 wt %, about 0.1 wt % to about 3 wt %, about 0.1 wt % to about 2 wt %, or about 0.1 wt % to about 1 wt % of one or more slack waxes, paraffin waxes, other waxes, based on a dried weight of the lignocellulose substrates. In another example, the lignocellulose composite product can include about 0.5 wt % to about 8 wt %, about 0.5 wt % to about 7 wt %, about 0.5 wt % to about 6 wt %, about 0.5 wt % to about 5 wt %, about 0.5 wt % to about 4 wt %, about 0.5 wt % to about 3 wt %, about 0.5 wt % to about 2 wt %, or about 0.5 wt % to about 1 wt % of one or more slack waxes, paraffin waxes, other waxes, based on a dried weight of the lignocellulose substrates.

In one or more embodiments, the lignocellulose composite product can include one or more binder compositions or resins, at least partially cured binder compositions or resins, or combinations thereof. The lignocellulose composite product can have varying concentrations of one or more binders or at least partially cured binder compositions. For example, the lignocellulose composite product can include about 0.01 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.2 wt %, about 3.4 wt %, about 3.6 wt %, about 3.8 wt %, about 4 wt %, about 4.2 wt %, about 4.4 wt %, about 4.6 wt %, about 4.8 wt %, or about 5 wt % to about 6 wt %, about 7 wt %, about 8 wt %, about 9 wt %, about 10 wt %, about 11 wt %, about 12 wt %, about 13 wt %, about 14 wt %, or about 15 wt % to about 16 wt %, about 17 wt %, about 18 wt %, about 19 wt %, about 20 wt %, about 25 wt %, about 30 wt %, about 35 wt %, about 40 wt %, or about 45 wt % of one or more binders or at least partially cured binder compositions, based on a dried weight of the lignocellulose substrates. In some examples, the lignocellulose composite product can include about 0.05 wt % to about 25 wt %, about 0.1 wt % to about 25 wt %, about 0.1 wt % to about 20 wt %, about 0.5 wt % to about 15 wt %, about 0.5 wt % to about 12 wt %, about 0.5 wt % to about 10 wt %, about 0.5 wt % to about 8 wt %, about 0.5 wt % to about 6 wt %, about 0.5 wt % to about 4 wt %, about 0.5 wt % to about 3 wt %, about 0.5 wt % to about 2 wt %, about 0.5 wt % to about 1.5 wt %, about 0.5 wt % to about 1 wt %, about 0.6 wt % to about 12 wt %, about 0.7 wt % to about 10 wt %, about 0.8 wt % to about 9 wt %, about 1 wt % to about 8 wt %, about 1 wt % to about 10 wt %, about 1 wt % to about 9 wt %, about 1 wt % to about 7 wt %, about 1 wt % to about 5 wt %, about 1 wt % to about 4 wt %, or about 1 wt % to about 2 wt % of the binder composition and/or the at least partially cured binder composition, based on a dried weight of the lignocellulose substrates. In at least one example, the lignocellulose composite product can include about 0.5 wt % to about 10 wt %, about 1 wt % to about 8 wt %, about 1.5 wt % to about 6 wt %, about 2 wt % to about 4 wt %, about 3 wt % to about 6 wt %, about 5 wt % to about 10 wt %, about 6 wt % to about 12 wt %, or about 7 wt % to about 9 wt % of the binder composition and/or the at least partially cured binder composition, based on a dried weight of the lignocellulose substrates.

In another example, the lignocellulose composite product can include about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt % to about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt % of one or more binder compositions, based on a dried weight of the lignocellulose substrates. In some examples, the lignocellulose composite product can include about 10 wt % to about 60 wt %, about 20 wt % to about 50 wt %, about 25 wt % to about 45 wt %, about 25 wt % to about 40 wt %, about 30 wt % to about 40 wt %, about 31 wt % to about 39 wt %, about 32 wt % to about 38 wt %, about 33 wt % to about 37 wt %, about 34 wt % to about 36 wt %, or about 35 wt % of one or more binder compositions, based on a dried weight of the lignocellulose substrates.

The binder composition can include one or more polymeric materials, homopolymeric materials, copolymeric materials, oligomeric materials, resin materials, combinations thereof, or any mixture thereof. Illustrative binder compositions can include, but are not limited to, a melamine-formaldehyde resin, a urea-formaldehyde resin, a phenol-formaldehyde resin, a melamine-urea-formaldehyde resin, a phenol-melamine-urea-formaldehyde resin, a resorcinol-formaldehyde resin, a phenol-resorcinol-formaldehyde resin, a methylene diphenyl diisocyanate (MDI), a polymeric methylene diphenyl diisocyanate (pMDI), a polyurethane (PU), a polyamide-epihalohydrin (PAE) resin, a styrene maleic anhydride (SMA) copolymer, a cationic styrene maleimide (SMI) resin, emulsified polymer isocyanate (EPI) adhesives, combinations thereof, or any mixture thereof. In some examples, the emulsified polymer isocyanate adhesives can include two-component adhesives based on a reaction mixture of water based emulsions, such as styrene butadiene rubber (SBR), ethylene vinyl acetate (EVA), or polyvinyl acetates (PVAc) with an isocyanate hardener or cross-linker for forming water-resistant bonds. The vinyl acetate copolymer emulsions can be internally flexibilized with a linker, for example, ethylene or acrylate, to form vinyl acetate ethylene (VAE) copolymers, ethylene vinyl acetate (EVA) copolymers, or vinyl acetate acrylate (VAA) copolymers.

Compositions and methods, including binders and/or resins that can be used to make the lignocellulose composite products can include those discussed and described in U.S. Patent Application Publication Nos. 2011/0165398 and 2013/0292864.

In one or more embodiments, the lignocellulose composite product can include lignocellulose substrates, one or more hydrophobizing agents, and one or more oxidative binders. The hydrophobizing agent can include about 30 wt % to about 98 wt % of the one or more fatty acid compounds, about 0.1 wt % to about 15 wt % of the one or more rosin acid compounds, and about 1 wt % to about 40 wt % of one or more unsaponifiable compounds. In one or more embodiments, the lignocellulose composite product containing one or more oxidative binders can be made or produced by a method that includes combining the plurality of lignocellulose substrates, one or more hydrophobizing agents, and one or more free radical precursors to produce the mixture. In some examples, the free radical precursors can be combined with the lignocellulose substrates and/or the hydrophobizing agents. In other examples, an oxidative binder composition containing one or more of the free radical precursors can be combined with the lignocellulose substrates and/or the hydrophobizing agents.

In one embodiment, the lignocellulose substrates can be first combined or otherwise contacted with the hydrophobizing agent, and then combined or otherwise contacted with the free radical precursors and/or the oxidative binder composition to produce the mixture. In another embodiment, the lignocellulose substrates can be first combined or otherwise contacted with the free radical precursors and/or the oxidative binder composition, and then combined or otherwise contacted with the hydrophobizing agent to produce the mixture. In another embodiment, the lignocellulose substrates, the hydrophobizing agent, and the free radical precursors and/or the oxidative binder composition can be combined or contacted together at substantially the same time to produce the mixture.

The method can also include at least partially curing, substantially curing, or completely curing the mixture containing the free radical precursors or the oxidative binder composition to produce the lignocellulose composite product. The one or more free radical precursors or the oxidative binder composition can include one or more oxidants. In one example, the one or more free radical precursors or the oxidative binder composition can include a mixture of hydrogen peroxide and one or more catalysts. The catalysts can include complexed metal catalysts or metal-containing catalysts, such as iron-containing catalysts, which can optionally be encapsulated or at least partially coated to form an encapsulated catalyst or a wax emulsified catalyst. In some examples, the one or more free radical precursors can include a mixture of hydrogen peroxide and one or more iron-containing catalysts.

Compositions and methods, including catalyst, oxidants, and resins, related to oxidative binders and/or free radical precursors that can be used to make the lignocellulose composite products can include those discussed and described in U.S. Patent Application Publication Nos. 2014/0090577, 2014/0094562, 2014/0275360, 2014/0275361, and 2015/0090157 and U.S. Provisional patent application Ser. No. 14/673,862, filed Mar. 30, 2015.

A variety of lignocellulose composite products and other fiber or wood based composite products can be made by bonding the plurality of lignocellulose substrates or other fibers and/or substrates, one or more hydrophobizing agents, and one or more binders or at least partially cured binder compositions into a unitary product. The fiber or wood based composite products can include or be made from lignocellulose substrates and/or cellulosic fibers, although synthetic fibers can be used alone or with lignocellulose substrates and/or cellulosic fibers to make such products.

In one or more embodiment, the lignocellulose composite product can include fiber webs (e.g., cellulosic fiber webs) and/or the fibers (e.g., cellulosic fibers) can include at least one material selected from bleached furnish, softwood, hardwood, wood pulp, mechanical pulp, or any mixture thereof. The term "cellulosic", "cellulosic sheet", "cellulosic fiber", "cellulosic fiber web", "fiber", "fiber web", "mat", "fiber mat", and the like, is meant to include any product incorporating wood or fiber having cellulose as a major constituent. The terms "fibers" or "wood" include virgin pulps, recycle (secondary) cellulosic fibers, or fiber mixtures containing virgin cellulosic fibers and/or reconstituted cellulosic fibers. Fibers suitable for making or producing the cellulosic fiber webs, fibrous sheets, and wood products and sheets of embodiments described herein can include: non-wood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood kraft fibers; hardwood fibers, such as eucalyptus, maple, birch, aspen, as well as mixtures or combinations of softwoods and hardwoods, for example, a bleached furnish (60% hardwood and 40% softwood, by weight). Illustrative types of wood can include, but are not limited to, alder, almond, ash, aspen, basswood, beech, birch, cedar, cherry, chestnut, cottonwood, cypress, elm, eucalyptus, fir, gum, hackberry, hickory, huiache, maple, mesquite, oak, peach, pear, pecan, pine, poplar, redwood, sassafras, spruce, sycamore, tallow, walnut, and willow. Fibers or wood used in connection with embodiments described herein can include naturally occurring pulp-derived fibers as well as reconstituted cellulosic fibers such as lyocell or rayon. Fibers or wood can be liberated from their source material by any one of a number of chemical pulping processes familiar to one experienced in the art including sulfate, sulfite, polysulfide, soda pulping, as well as other processes. The pulp can be bleached if desired by chemical means including the use of chlorine, chlorine dioxide, oxygen, ozone, hydrogen peroxide, alkaline peroxide, rear earth peroxides, as well as other compounds. Naturally occurring pulp-derived fibers are referred to herein simply as "pulp-derived" fibers or wood. The fiber or paper products discussed and described herein can include a blend of conventional fibers (whether derived from virgin pulp or recycle sources) and high coarseness lignin-rich tubular fibers, such as bleached chemical thermomechanical pulp (BCTMP). Pulp-derived fibers thus can also include high yield fibers such as BCTMP as well as thermomechanical pulp (TMP), chemithermomechanical pulp (CTMP) and alkaline peroxide mechanical pulp (APMP). Recycled fibers are generally shorter, stiffer, curlier and more brittle than virgin fibers. Dewatering tests can assess fines content and the degree of external fibrillation. These tests measure how easily water drains from the wood fibers, furnish, or pulp. The Schopper-Riegler (SR) number and the Canadian Standard Freeness (CSF) are the most common dewatering tests. The SR number increases with beating and fines content while the CSF decreases.

The starting material, from which the substrates can be derived from, can be reduced to the appropriate size, if desired for a particular product being produced, by various processes such as hogging, grinding, hammer milling, tearing, shredding, and/or flaking. Suitable forms of the substrates can include, but are not limited to, chips, fibers, shavings, sawdust or dust, or the like.

The lignocellulose substrates can be contacted with one or more hydrophobizing agents and one or more binder compositions by spraying, coating, agitating, mixing, stirring, blending, tumbling, brushing, falling film or curtain coater, dipping, soaking, extrusion, or the like. The plurality of lignocellulose substrates contacted with one or more hydrophobizing agents and one or more binder compositions can be referred to as the mixture or furnish of the substrates, the hydrophobizing agents, and the binder compositions. The lignocellulose substrates contacted with one or more hydrophobizing agents and one or more binder compositions can be formed into a desired shape before, during, and/or after at least partial curing of one or more hydrophobizing agents and one or more binder compositions. Depending on the particular product, the lignocellulose substrates contacted with one or more hydrophobizing agents and one or more binder compositions can be pressed before, during, and/or after one or more hydrophobizing agents and one or more binder compositions is at least partially cured. For example, the lignocellulose substrates contacted with one or more hydrophobizing agents and one or more binder compositions can be consolidated or otherwise formed into a desired shape, if desired pressed to a particular density and thickness, and heated to at least partially cure one or more hydrophobizing agents and one or more binder compositions.

In some embodiments, the moisture content of the lignocellulose substrates, or other fibrous or wood particles or flakes, can be measured and recorded as a first moisture content. In some examples, the first moisture content can be about 0.5 wt % to about 15 wt %, or about 1 wt % to about 10 wt %. For example, the first moisture content can be about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, about 5 wt %, about 5.1 wt %, about 5.2 wt %, about 5.3 wt %, about 5.4 wt %, about 5.5 wt %, about 5.6 wt %, about 5.7 wt %, about 5.8 wt % or about 5.9 wt % to about 6 wt %, about 6.1 wt %, about 6.2 wt %, about 6.3 wt %, about 6.4 wt %, about 6.5 wt %, about 6.6 wt %, about 6.7 wt %, about 6.8 wt %, about 6.9 wt %, about 7 wt %, about 7.1 wt %, about 7.2 wt %, about 7.3 wt %, about 7.4 wt %, about 7.5 wt %, about 7.6 wt %, about 7.7 wt %, about 7.8 wt %, about 7.9 wt %, about 8 wt %, about 8.1 wt %, about 8.2 wt %, about 8.3 wt %, about 8.4 wt %, about 8.5 wt %, about 8.6 wt %, about 8.7 wt %, about 8.8 wt %, about 8.9 wt %, about 9 wt %, about 9.1 wt %, about 9.2 wt %, about 9.3 wt %, about 9.4 wt %, about 9.5 wt %, about 9.6 wt %, about 9.7 wt %, about 9.8 wt %, about 9.9 wt %, about 10 wt %, about 11 wt %, about 12 wt %, about 13 wt %, about 14 wt %, or about 15 wt %, or greater.

The lignocellulose substrates can be added into a mixer or blender, such as a rotatable drum blender. One or more hydrophobizing agents can be added onto the lignocellulose substrates and then agitated to produce a mixture containing at least the lignocellulose substrates and one or more hydrophobizing agents. Subsequently, one or more binder compositions can be added to the mixture and further agitated to produce a mixture containing at least the lignocellulose substrates, one or more hydrophobizing agents, and one or more binder compositions. The moisture content of the mixture can be measured and recorded as a second moisture content. The second moisture concentration can be about 4 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, about 5 wt %, about 5.1 wt %, about 5.2 wt %, about 5.3 wt %, about 5.4 wt %, about 5.5 wt %, about 5.6 wt %, about 5.7 wt %, about 5.8 wt % or about 5.9 wt % to about 6 wt %, about 6.1 wt %, about 6.2 wt %, about 6.3 wt %, about 6.4 wt %, about 6.5 wt %, about 6.6 wt %, about 6.7 wt %, about 6.8 wt %, about 6.9 wt %, about 7 wt %, about 7.1 wt %, about 7.2 wt %, about 7.3 wt %, about 7.4 wt %, about 7.5 wt %, about 7.6 wt %, about 7.7 wt %, about 7.8 wt %, about 7.9 wt %, about 8 wt %, about 8.1 wt %, about 8.2 wt %, about 8.3 wt %, about 8.4 wt %, about 8.5 wt %, about 8.6 wt %, about 8.7 wt %, about 8.8 wt %, about 8.9 wt %, about 9 wt %, about 9.1 wt %, about 9.2 wt %, about 9.3 wt %, about 9.4 wt %, about 9.5 wt %, about 9.6 wt %, about 9.7 wt %, about 9.8 wt %, about 9.9 wt %, Or about 10 wt %, or greater.

In one or more embodiments, based on the differences in the first and second moisture contents, a designated amount of the mixture containing the lignocellulose substrates, one or more hydrophobizing agents, and one or more binder compositions can be shaped into a mat of the mixture. The mats can be pressed and heated for a predetermined amount of time to at least partially cure the binder resin composition and produce the lignocellulose composite product. In some embodiments, the mats can be pressed at a pressure of about 6.9 bar to about 51.7 bar, about 31 bar to about 51.7 bar, or about 31. bar to about 48.3 bar at a temperature of about 90° C. to about 500° C., about 100° C. to about 400° C., about 138° C. to about 250° C., about 149° C. to about 232° C., about 121° C. to about 316° C., or about 149° C. to about 210° C. for a time period of about 30 seconds (s) to about 15 minutes (min) or about 1 min to about 10 min or about 1 min to about 5 min.

For example, the mats can be pressed and heated at a pressure of about 6.9 bar, about 7 bar, about 8 bar, about 9 bar, about 10 bar, about 11 bar, about 12 bar, about 13 bar, about 14 bar, about 15 bar, about 16 bar, about 17 bar, about 18 bar, about 19 bar, about 15 bar, about 20 bar, about 21 bar, about 22 bar, about 23 bar, about 24 bar, about 25 bar, about 26 bar, about 27 bar, about 28 bar, about 29 bar, about 30 bar, about 31 bar, about 32 bar, about 33 bar, or about 34 bar to about 35 bar, about 36 bar, about 37 bar, about 38 bar, about 39 bar, about 40 bar, about 41 bar, about 42 bar, about 43 bar, about 44 bar, about 45 bar, about 46 bar, about 47 bar, about 48 bar, about 49 bar, about 50 bar, about 51 bar, or about 52 bar, or greater, depending on the specific type of composite product to be produced, as well as the density and/or dimensions of the produced composite product. In some examples, the mats can be pressed and heated at a temperature of about 90° C., about 95° C., about 100° C., about 110° C., about 120° C., about 130° C., about 140° C., or about 150° C. to about 160° C., about 170° C., about 180° C., about 190° C., about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., about 410° C., about 420° C., about 430° C., about 440° C., about 450° C., about 460° C., about 470° C., about 480° C., about 490° C., about 500° C., or greater, depending on the specific type of composite product to be produced, as well as the density and/or dimensions of the produced composite product.

In some examples, the mats can be pressed and heated for about 5 s, about 10 s, about 15 s, about 20 s, about 25 s, about 30 s, about 35 s, about 40 s, about 45 s, about 50 s, about 55 s, about 60 s, about 65 s, about 70 s, about 75 s, about 80 s, about 85 s, about 90 s, about 95 s, about 100 s, about 105 s, about 110 s, about 115 s, about 2 min, about 2.5 min, about 3 min, about 3.5 min, about 4 min, about 4.5 min, about 5 min, about 5.5 min, about 6 min, about 6.5 min, about 7 min, about 7.5 min, about 8 min, about 8.5 min, about 9 min, about 9.5 min, about 10 min, about 10.5 min, about 11 min, about 11.5 min, about 12 min, about 12.5 min, about 13 min, about 13.5 min, about 14 min, about 14.5 min, about 15 min, about 16 min, about 17 min, about 18 min, about 19 min, about 20 min, or greater, depending on the specific type of composite product to be produced, as well as the density and/or dimensions of the produced composite product. For example, the mats can be pressed and heated for about 5 s to about 30 s, about 30 s to about 1 min, about 30 s to about 2 min, about 30 s to about 3 min, about 30 s to about 4 min, about 30 s to about 5 min, about 30 s to about 6 min, about 30 s to about 7 min, about 30 s to about 8 min, about 30 s to about 9 min, about 30 s to about 10 min, about 30 s to about 15 min, about 1 min to about 5 min, about 1 min to about 10 min, about 2 min to about 6 min, about 5 min to about 15 min, or about 5 min to about 10 min, depending on the specific type of composite product to be produced, as well as the density and/or dimensions of the produced composite product.

In one or more embodiments, a method for producing the lignocellulose composite product can include contacting or combining the plurality of lignocellulose substrates with one or more hydrophobizing agents and one or more binder compositions to produce a mixture. The method can also include at least partially curing the binder composition within the mixture to produce the hydrophobized, lignocellulose composite product. Generally, the mixture produced by contacting or combining the lignocellulose substrates, the hydrophobizing agent, and the binder composition can be in a solid state, a liquid state, a wax form, a powder form, a solution, a suspension, a slurry, an emulsion, or an inverse emulsion, and can be in a single phase or have multiple phases. Illustrative processes or techniques that can be used to combine or contact the lignocellulose substrates, the hydrophobizing agent, and/or the binder composition can include spraying, coating, agitating, mixing, stirring, blending, tumbling, sonication or vibration, brushing, falling film or curtain coater, dipping, soaking, extrusion, or the like.

The lignocellulose substrates, the hydrophobizing agent, and the binder composition can be combined or contacted with each other in any order or at the same time to produce the mixture. In one example, the lignocellulose substrates can be first combined or otherwise contacted with the hydrophobizing agent, and then combined or otherwise contacted with the binder composition to produce the mixture. In another example, the lignocellulose substrates can be first combined or otherwise contacted with the binder composition, and then combined or otherwise contacted with the hydrophobizing agent to produce the mixture. In another example, the lignocellulose substrates, the hydrophobizing agent, and the binder composition can be combined or contacted together at substantially the same time to produce the mixture.

In another embodiment, a lignocellulose composite product can include the plurality of lignocellulose substrates, one or more hydrophobizing agents, and one or more at least partially cured binder compositions. The hydrophobizing agent can include about 30 wt % to about 98 wt % of the one or more fatty acid compounds, about 0.1 wt % to about 15 wt % of the one or more rosin acid compounds, and about 1 wt % to about 40 wt % of one or more unsaponifiable compounds. In some examples, prior to curing the binder composition, the uncured binder composition can include an aldehyde-based resin and a copolymer having one or more unsaturated carboxylic acids, one or more unsaturated carboxylic anhydrides, or a combination thereof, and one or more vinyl aromatic derived units. The aldehyde-based resin can include one or more of a urea-aldehyde resin, a melamine-aldehyde resin, a phenol-aldehyde resin, a resorcinol-aldehyde resin, a phenol-resorcinol-aldehyde resin, a melamine-urea-aldehyde resin, a phenol-melamine-urea-aldehyde resin, a phenol-urea-aldehyde resin, or any combination thereof.

The lignocellulose composite product can be formed into a variety of different fiber containing composite products, wood-containing composite products, or a mixture thereof. Illustrative fiber and/or wood containing composite products, such as the lignocellulose composite products, can include, but are not limited to, orientated strand boards (OSB), particleboards, high density fiberboards (HDF), medium density fiberboards (MDF), or low density fiberboards (LDF), or other types of fiberboards.

The lignocellulose composite product can have a water absorption of about 60 wt % or less, about 55 wt % or less, about 50 wt % or less, about 45 wt % or less, about 44 wt % or less, about 43 wt % or less, about 42 wt % or less, about 41 wt % or less, about 40 wt % or less, about 39 wt % or less, about 38 wt % or less, about 37 wt % or less, about 36 wt % or less, about 35 wt % or less, about 34 wt % or less, about 33 wt % or less, about 32 wt % or less, about 31 wt % or less, about 30 wt % or less, about 29 wt % or less, about 28 wt % or less, about 27 wt % or less, about 26 wt % or less, about 25 wt % or less, about 24 wt % or less, about 23 wt % or less, about 22 wt % or less, about 21 wt % or less, about 20 wt % or less, about 15 wt % or less, about 10 wt % or less, as measured according to the Water Absorption and Thickness Swelling Test under ASTM D1037-96a. In some examples, the lignocellulose composite product can have a water absorption of about 10 wt % to about 60 wt %, about 15 wt % to about 55 wt %, about 20 wt % to about 50 wt %, about 20 wt % to about 45 wt %, about 20 wt % to about 40 wt %, or about 20 wt % to about 35 wt %, as measured according to the Water Absorption and Thickness Swelling Test under ASTM D1037-96a.

The lignocellulose composite product can have a thickness swelling of about 40 wt % or less, about 35 wt % or less, about 30 wt % or less, about 25 wt % or less, about 24 wt % or less, about 23 wt % or less, about 22 wt % or less, about 21 wt % or less, about 20 wt % or less, about 19 wt % or less, about 18 wt % or less, about 17 wt % or less, about 16 wt % or less, about 15 wt % or less, about 14 wt % or less, about 13 wt % or less, about 12 wt % or less, about 11 wt % or less, about 10 wt % or less, about 9 wt % or less, about 8 wt % or less, about 7 wt % or less, about 6 wt % or less, or about 5 wt % or less, as measured according to the Water Absorption and Thickness Swelling Test under ASTM D1037-96a. In some examples, the lignocellulose composite product can have a thickness swelling of about 5 wt % to about 30 wt %, about 10 wt % to about 25 wt %, about 11 wt % to about 25 wt %, about 12 wt % to about 25 wt %, about 13 wt % to about 25 wt %, about 14 wt % to about 25 wt %, about 15 wt % to about 25 wt %, about 16 wt % to about 25 wt %, about 17 wt % to about 25 wt %, about 18 wt % to about 25 wt %, about 19 wt % to about 25 wt %, or about 20 wt % to about 25 wt %, as measured according to the Water Absorption and Thickness Swelling Test under ASTM D1037-96a.

In some examples, the lignocellulose composite product can have a water absorption of about 50 wt % or less and a thickness swelling of about 15 wt % or less, as measured according to the Water Absorption and Thickness Swelling Test under ASTM D1037-96a. In other examples, the water absorption can be about 40 wt % or less and the thickness swelling can be about 10 wt % or less, as measured according to the Water Absorption and Thickness Swelling Test under ASTM D1037-96a. In other examples, the water absorption can be about 30 wt % or less and the thickness swelling can be about 10 wt % or less, as measured according to the Water Absorption and Thickness Swelling Test under ASTM D1037-96a. In other examples, the water absorption can be about 20 wt % or less and the thickness swelling can be about 5 wt % or less, as measured according to the Water Absorption and Thickness Swelling Test under ASTM D1037-96a.

In some embodiments, the lignocellulose composite product can have a density of about 0.4 g/cm$^3$, about 0.41 g/cm$^3$, about 0.42 g/cm$^3$, about 0.43 g/cm$^3$, about 0.44 g/cm$^3$, about 0.45 g/cm$^3$, about 0.46 g/cm$^3$, about 0.47 g/cm$^3$, about 0.48 g/cm$^3$, about 0.49 g/cm$^3$, about 0.5 g/cm$^3$, about 0.51 g/cm$^3$, about 0.52 g/cm$^3$, about 0.53 g/cm$^3$, about 0.54 g/cm$^3$, about 0.55 g/cm$^3$, about 0.56 g/cm$^3$, about 0.57 g/cm$^3$, about 0.58 g/cm$^3$, about 0.59 g/cm$^3$, 0.6 g/cm$^3$, about 0.61 g/cm$^3$, about 0.62 g/cm$^3$, about 0.63 g/cm$^3$, about 0.64 g/cm$^3$, or about 0.65 g/cm$^3$ to about 0.66 g/cm$^3$, about 0.67 g/cm$^3$, about 0.68 g/cm$^3$, about 0.69 g/cm$^3$, 0.7 g/cm$^3$, about 0.71 g/cm$^3$, about 0.72 g/cm$^3$, about 0.73 g/cm$^3$, about 0.74 g/cm$^3$, about 0.75 g/cm$^3$, about 0.76 g/cm$^3$, about 0.77 g/cm$^3$, about 0.78 g/cm$^3$, about 0.79 g/cm$^3$, 0.8 g/cm$^3$, about 0.81 g/cm$^3$, about 0.82 g/cm$^3$, about 0.83 g/cm$^3$, about 0.84 g/cm$^3$, about 0.85 g/cm$^3$, about 0.86 g/cm$^3$, about 0.87 g/cm$^3$, about 0.88 g/cm$^3$, about 0.89 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, about 0.96 g/cm$^3$, about 0.97 g/cm$^3$, about 0.98 g/cm$^3$, about 0.99 g/cm$^3$, or about 1 g/cm$^3$. In some specific examples, the lignocellulose composite product can have a density of about 0.48 g/cm$^3$ (about 30 lbs/ft$^3$) to about 0.96 g/cm$^3$ (about 60 lbs/ft$^3$), about 0.51 g/cm$^3$ (about 32 lbs/ft$^3$) to about 0.83 g/cm$^3$ (about 52 lbs/ft$^3$), or about 0.59 g/cm$^3$ (about 37 lbs/ft$^3$) to about 0.72 g/cm$^3$ (about 45 lbs/ft$^3$).

The lignocellulose composite product can have a thickness of about 0.1 cm, about 0.2 cm, about 0.3 cm, about 0.4 cm, about 0.5 cm, about 0.6 cm, about 0.7 cm, about 0.8 cm, about 0.9 cm, or about 1 cm to about 1.1 cm, about 1.2 cm, about 1.3 cm, about 1.4 cm, about 1.5 cm, about 1.6 cm, about 1.7 cm, about 1.8 cm, about 1.9 cm, about 2 cm, about 2.1 cm, about 2.2 cm, about 2.3 cm, about 2.4 cm, about 2.5 cm, about 2.6 cm, about 2.7 cm, about 2.8 cm, about 2.9 cm, about 3 cm, about 3.5 cm, about 4 cm, about 4.5 cm, about 5 cm, or thicker. In some examples, the lignocellulose composite product can have a thickness of about 0.32 cm to about 3.81 cm, about 0.32 cm to about 3.18 cm, about 0.32 cm to about 2.54 cm, about 0.32 cm to about 1.91 cm, about 0.64 cm to about 3.81 cm, about 0.64 cm to about 3.18 cm, about 0.64 cm to about 2.54 cm, or about 0.64 cm to about 1.91 cm.

The lignocellulose composite product can have an internal bond strength of about 621 kPa, about 627 kPa, about 634 kPa, about 641 kPa, about 648 kPa, about 655 kPa, about 662 kPa, about 669 kPa, about 676 kPa, about 683 kPa, or about 689 kPa to about 696 kPa, about 703 kPa, about 710 kPa, about 717 kPa, about 724 kPa, about 731 kPa, about 738 kPa, about 745 kPa, about 752 kPa, about 758 kPa, or greater. In some examples, the lignocellulose composite product can have an internal bond strength of about 621 kPa to about 758 kPa, about 655 kPa to about 724 kPa, about 662 kPa to about 717 kPa, about 669 kPa to about 710 kPa, about 676 kPa to about 703 kPa, about 683 kPa to about 696 kPa, or about 689 kPa to about 758 kPa. The internal bond strength for each example can be determined according to the test procedure provided for in ASTM D1037-96a.

EXAMPLES

In order to provide a better understanding of the foregoing discussion, the following non-limiting examples are offered. Although the examples can be directed to specific embodiments, they are not to be viewed as limiting the invention in any specific respect.

Example I

The synergetic effects due to hydrophobizing agents contained within the lignocellulose composite product is highlighted by the results of Examples 1-7, summarized below in Table 2. The lignocellulose composite products, oriented strand boards (OSBs), contain varying amounts and types of hydrophobizing agents, with the exception of Example 1, which contained no hydrophobizing agent and was used as a control. Otherwise, the same components, treatments, and process steps, including pressing and panel manufacturing parameters, were used to produce the OSBs in Examples 1-7, as listed below in Table 1.

TABLE 1

| | |
|---|---|
| Wood Flakes | southern yellow pine |
| Dimensions (cm) | 45.7 × 45.7 × 1.11 |
| Wax or Wax alternative (%) | 0, 1, or 2 |
| Press Temperature (° C.) | 210 |
| Press Time (minutes) | 4 |
| OD Felt Weight (grams) | 1,395 |
| Resin type | phenolic resin |
| Resin % | 4% (NVS based on OD Wood) |
| Moisture of Furnish (%) | 3-4 |
| Density Target (g/cm$^3$) | 0.67 |

Example 1—Control (No Hydrophobizing Agent)

About 1,395 grams of wood flakes (southern yellow pine) having a moisture content of about 4.0 wt % were added into a rotatable drum blender. About 480 grams of a binder resin composition, RESI-STRAN® 155C42 phenolic resin, commercially available from Georgia-Pacific Chemicals LLC, was sprayed onto the wood flakes tumbling in the rotatable drum blender. Once all of the binder resin composition was sprayed onto the wood flakes, the mixture tumbled about 2 minutes to about 3 minutes longer to obtain a consistent mixture. The moisture content of the mixture was measured at about 7.2 wt %. Based on the differences in the wood flake moisture content and the mixture moisture content, about 1,503 g of the mixture containing the wood flakes and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

Example 2—Slack Wax (1 wt %)

About 1,395 grams of wood flakes (southern yellow pine) having a moisture content of about 3.6 wt % were added into a rotatable drum blender. About 14 grams of slack wax, commercially available from ExxonMobil Chemical Company, was sprayed onto the wood flakes tumbling in the rotatable drum blender. Once all of the slack wax was sprayed onto the wood flakes, the mixture tumbled about 2 minutes to about 3 minutes. Subsequently, about 480 grams of a binder resin composition, RESI-STRAN® 155C42 phenolic resin, commercially available from Georgia-Pacific Chemicals LLC, was sprayed onto the coated wood flakes tumbling in the rotatable drum blender. Once all of the binder resin composition was sprayed onto the coated wood flakes, the mixture tumbled about 2 minutes to about 3 minutes longer to obtain a consistent mixture. The moisture content of the mixture was measured at about 7.3 wt %. Based on the differences in the wood flake moisture content and the mixture moisture content, about 1,505 g of the mixture containing the wood flakes, the slack wax, and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

Example 3—Slack Wax (2 wt %)

About 1,395 grams of wood flakes (southern yellow pine) having a moisture content of about 3.6 wt % were added into a rotatable drum blender. About 28 grams of slack wax, commercially available from ExxonMobil Chemical Company, was sprayed onto the wood flakes tumbling in the rotatable drum blender. Once all of the slack wax was sprayed onto the wood flakes, the mixture tumbled about 2 minutes to about 3 minutes. Subsequently, about 480 grams of a binder resin composition, RESI-STRAN® 155C42 phenolic resin, commercially available from Georgia-Pacific Chemicals LLC, was sprayed onto the coated wood flakes tumbling in the rotatable drum blender. Once all of the binder resin composition was sprayed onto the coated wood flakes, the mixture tumbled about 2 minutes to about 3 minutes longer to obtain a consistent mixture. The moisture content of the mixture was measured at about 7.2 wt %. Based on the differences in the wood flake moisture content and the mixture moisture content, about 1,503 g of the mixture containing the wood flakes, the slack wax, and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

Example 4—HAV Heads (1 wt %)

About 1,395 grams of wood flakes (southern yellow pine) having a moisture content of about 3.9 wt % were added into a rotatable drum blender. The wood flakes were added into a rotatable drum blender. About 14 grams of an HAV head composition, Light HAV Heads, commercially available from. Georgia-Pacific Chemicals LLC, was sprayed onto the wood flakes tumbling in the rotatable drum blender. Once all of the HAV head composition was sprayed onto the wood flakes, the mixture tumbled about 2 minutes to about 3 minutes. Subsequently, about 480 grams of a binder resin composition, RESI-STRAN® 155C42 phenolic resin, commercially available from Georgia-Pacific Chemicals LLC, was sprayed onto the coated wood flakes tumbling in the rotatable drum blender. Once all of the binder resin composition was sprayed onto the coated wood flakes, the mixture tumbled about 2 minutes to about 3 minutes longer to obtain a consistent mixture. The moisture content of the mixture was measured at about 7.6 wt %. Based on the differences in the wood flake moisture content and the mixture moisture content, about 1,510 g of the mixture containing the wood flakes, the HAV head composition, and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

Example 5—HAV Heads (2 wt %)

About 1,395 grams of wood flakes (southern yellow pine) having a moisture content of about 3.9 wt % were added into a rotatable drum blender. The wood flakes were added into a rotatable drum blender. About 28 grams of an HAV head composition, Light HAV Heads, commercially available from Georgia-Pacific Chemicals LLC, was sprayed onto the wood flakes tumbling in the rotatable drum blender. Once all of the HAV head composition was sprayed onto the wood flakes, the mixture tumbled about 2 minutes to about 3 minutes. Subsequently, about 480 grams of a binder resin composition, RESI-STRAN® 155C42 phenolic resin, commercially available from Georgia-Pacific Chemicals LLC, was sprayed onto the coated wood flakes tumbling in the rotatable drum blender. Once all of the binder resin composition was sprayed onto the coated wood flakes, the mixture tumbled about 2 minutes to about 3 minutes longer to obtain a consistent mixture. The moisture content of the mixture was measured at about 8.3 wt %. Based on the differences in the wood flake moisture content and the mixture moisture content, about 1,521 g of the mixture containing the wood flakes, the HAV head composition, and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

Example 6—CTO (1 wt %)

About 1,395 grams of wood flakes (southern yellow pine) having a moisture content of about 3.5 wt % were added into a rotatable drum blender. The wood flakes were added into a rotatable drum blender. About 14 grams of a crude tall oil composition, commercially available from Georgia-Pacific Chemicals LLC, was sprayed onto the wood flakes tumbling in the rotatable drum blender. Once all of the crude tall oil composition was sprayed onto the wood flakes, the mixture tumbled about 2 minutes to about 3 minutes. Subsequently, about 480 grams of a binder resin composition, RESI-STRAN® 155C42 phenolic resin, commercially available from Georgia-Pacific Chemicals LLC, was sprayed onto the coated wood flakes tumbling in the rotatable drum blender. Once all of the binder resin composition was sprayed onto the coated wood flakes, the mixture tumbled about 2 minutes to about 3 minutes longer to obtain a consistent mixture. The moisture content of the mixture was measured at about 6.7 wt %. Based on the differences in the wood flake moisture content and the mixture moisture content, about 1,495 g of the mixture containing the wood flakes, the crude tall oil composition, and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

Example 7—CTO (2 wt %)

About 1,395 grams of wood flakes (southern yellow pine) having a moisture content of about 3.5 wt % were added into a rotatable drum blender. The wood flakes were added into a rotatable drum blender. About 28 grams of a crude tall oil composition, commercially available from Georgia-Pacific Chemicals LLC, was sprayed onto the wood flakes tumbling in the rotatable drum blender. Once all of the crude tall oil composition was sprayed onto the wood flakes, the mixture tumbled about 2 minutes to about 3 minutes. Subsequently, about 480 grams of a binder resin composition, RESI-STRAN® 155C42 phenolic resin, commercially available from Georgia-Pacific Chemicals LLC, was sprayed onto the coated wood flakes tumbling in the rotatable drum blender. Once all of the binder resin composition was sprayed onto the coated wood flakes, the mixture tumbled about 2 minutes to about 3 minutes longer to obtain a consistent mixture. The moisture content of the mixture was measured at about 7.3 wt %. Based on the differences in the wood flake moisture content and the mixture moisture content, about 1,505 g of the mixture containing the wood flakes, the crude tall oil composition, and the binder resin composition was transferred into a forming block and shaped into a mat of the mixture. The mat was pressed to desired thickness and to relieve stresses, then the pressure was reduced. The mat was pressed at about 31 bar to about 52 bar, for about 4 minutes at about 210° C. to at least partially cure the binder resin composition and to produce an OSB with a length of about 45.7 cm, a width of about 45.7 cm, and a thickness of about 1.11 cm.

As shown in the Table 2, Examples 1-7 compared Mean Density, Water Absorption, Thickness Swell Mean, and Internal Bond for OSBs that contain varying amounts and types of hydrophobizing agents. The OSB in Example 1 is a control and contained no hydrophobizing agent. The OSBs in Examples 2 and 3 contained 1 wt % and 2 wt % of slack wax, respectively. The OSBs in Examples 4 and 5 contained 1 wt % and 2 wt % of HAV heads, respectively. The OSBs in Examples 6 and 7 contained 1 wt % and 2 wt % of CTO, respectively.

TABLE 2

| Ex. | Hydrophobizing Agent | Agent Con. (wt %*) | Density Mean (lb/ft$^3$) {g/cm$^3$} | Water Absorption Mean (%) | Thickness Swell Mean (%) | Internal Bond (psi) {kPa} |
| --- | --- | --- | --- | --- | --- | --- |
| 1 | — | — | 44.2 {0.71} | 69.4 | 26.7 | 100.37 {692} |
| 2 | slack wax | 1 | 43.6 {0.70} | 26.2 | 12.3 | 98.15 {677} |
| 3 | slack wax | 2 | 43.8 {0.70} | 23.2 | 11.5 | 106.13 {732} |
| 4 | HAV heads | 1 | 44.8 {0.72} | 31.2 | 14.9 | 107.28 {740} |
| 5 | HAV heads | 2 | 43.4 {0.70} | 43.4 | 17.8 | 101.58 {700} |
| 6 | CTO | 1 | 42.5 {0.68} | 71.3 | 21.4 | 98.06 {676} |
| 7 | CTO | 2 | 44.2 {0.71} | 68.2 | 26.0 | 105.59 {728} |

*weight percent based on a dried weight of the lignocellulose substrates

In Examples 2, 3, and 5, the OSBs modified with 1% and 2% slack wax and 1% HAV heads and were statistically equivalent in thickness swell testing. Also, in Examples 2 and 3, the OSBs modified with 1% and 2% slack wax were statistically equivalent for water absorption. It has been surprisingly and unexpectedly discovered that contacting or combining the plurality of lignocellulose substrates (e.g., wood flakes) with HAV head hydrophobizing agents (Examples 4 and 5) and a phenolic binder resin produces OSBs with improved hydrophobizing properties. For example, the OSBs modified with 1% and 2% HAV head hydrophobizing agents had water absorptions of about 31.2% and about 43.4%, thickness swells of about 14.9% and about 17.8%, and internal bonds of about 740 kPa and about 700 kPa, for Examples 4 and 5, respectively. In comparison, the control OSB in Example 1 was not modified with a hydrophobizing agent and had a water absorption of about 69.4%, a thickness swell of about 26.7, and an internal bond of about 692 kPa. The HAV head hydrophobizing agent surprisingly and unexpectedly enhances the ability for the lignocellulose composite product to repel moisture and other forms of water when compared to similar wood products which lack a hydrophobizing agent (Example 1) and very similar to wood products which include slack wax (Examples 2 and 3). Surprisingly, the hydrophobizing agent prohibits or at least reduces water penetration and absorption into the hydrophobized, lignocellulose composite product—OSB. Therefore, water caused damages, such as swelling and warping, are eliminated or at least minimized to the HAV head hydrophobized, OSBs.

Example II

Properties of a particleboard made with a pitch emulsion as the hydrophobizing agent were compared to those of a particleboard made with a slack wax emulsion as the hydrophobizing agent and are shown by the results of Examples 8 and 9, summarized below in Table 4. The same components, treatments, and process steps, including pressing and panel manufacturing parameters, were used to produce the particleboard panels of Examples 8 and 9, which are listed below in Table 3.

TABLE 3

| | |
| --- | --- |
| Wood Particles | southern yellow pine |
| Dimensions (cm) | 30.5 × 5 × 1.1 |
| Formaldehyde Scavenger | 45 wt % aqueous urea |
| Press Temperature (° C.) | 165.5 |
| Press Time (s) | 280 |
| Resin type | melamine-urea-formaldehyde resin |
| Resin % | 8% (NVS based on OD Wood) |
| Moisture of Furnish (%) | 3-4 |
| Density Target (g/cm$^3$) | 0.77 |
| Hydrophobizing Agent | 0.5 wt %, based on OD Wood |

The pitch emulsion was prepared with tall oil fatty acids used as the emulsifier with a Ross bench-top mill (Charles Ross & Son Company). About 1,200 grams of water was heated to a temperature of about 60° C. and about 16 grams of a 50 wt % aqueous NaOH caustic solution was added to the water. The water and caustic mixture was loaded into a stainless steel beaker and the solution was stirred using the Ross bench-top mill. A mixture of tall oil pitch (GP XTOL® Tall Oil Pitch) and tall oil fatty acids was prepared by mixing about 600 grams of the tall oil pitch at a temperature of about 60° C. with about 200 grams of the tall oil fatty acids, which was at a temperature of about 60° C. The pitch and tall oil fatty acids mixture was then added to the stirred water and caustic mixture over approximately 1 minute. No additional heating was supplied during the addition of the pitch and tall oil fatty acids mixture to the water and caustic mixture. The pitch was emulsified upon contact with the aqueous phase, as evidenced by a light tan homogeneous appearance of the product. The pitch emulsion was removed from the Ross bench-top mill after the completion of the raw material addition and was allowed to cool to room temperature.

In making the particleboards, the wood particles were added into a rotatable drum blender. A sufficient amount of the pitch emulsion or slack wax emulsion (commercially available from ExxonMobil Chemical Company) was sprayed onto the wood particles tumbling in the rotatable drum blender. Once all of the pitch emulsion or slack wax was sprayed onto the wood flakes, the mixtures were tumbled about 2 minutes to about 3 minutes. Subsequently, a sufficient amount of a binder resin composition, RESI-STRAN® 155C42 phenolic resin, commercially available from Georgia-Pacific Chemicals LLC, was sprayed onto the coated wood particles tumbling in the rotatable drum blender. Once all of the binder resin composition was sprayed onto the coated wood flakes, the mixture tumbled about 2 minutes to about 3 minutes longer to obtain a consistent mixture, which was subsequently made into the particleboard panels. The properties of the particleboard panels are shown in Table 4 below.

TABLE 4

| Ex. | Hydrophobizing Agent | Agent (wt %*) | Internal Bond (psi) {kPa} | Water Absorption Mean (%) | Thickness Swell Mean (%) | Edge Swell (%) |
|---|---|---|---|---|---|---|
| 8 | Pitch emulsion | 0.5 | 65.4 {451} | 96.9 | 34.4 | 33.2 |
| 9 | slack wax | 0.5 | 44.6 {308} | 88.8 | 32.0 | 31.5 |

*weight percent based on a dried weight of the lignocellulose substrates

As shown in Table 4, the measured properties of the particleboard panel made with the pitch emulsion (Ex. 8) were generally comparable to the properties of the particleboard panel made with the slack wax (Ex. 9). The tax profile of the pitch emulsion of Ex. 8 was compared to the tack profile of the slack wax of Ex. 9. The tack profile test was performed by compressing a ball of resonated furnish by hand for approximately 10 seconds. The ball was bounced in the air and the number of bounces was counted until the ball no longer held together. The tack performance of the resonated furnish that contained the pitch emulsion (Ex. 8) was better than the tack performance of the resonated furnish that contained the slack wax (Ex. 9). The tack rating (number of bounces) for the resonated furnish of Ex. 8 was 30, 15, 16, and 8 at a time zero, after 10 minutes, after 20 minutes, and after 30 minutes, respectively, upon forming the resonated furnish. The tack rating (number of bounces) for the resonated furnish of Ex. 9 was 7, 4, 3, and 3 at a time zero, after 10 minutes, after 20 minutes, and after 30 minutes, respectively, upon forming the resonated furnish.

Embodiments of the present disclosure further relate to any one or more of the following paragraphs:

1. A method for producing a lignocellulose or fibrous based composite product, comprising: combining a plurality of lignocellulose or fibrous substrates, a hydrophobizing agent, and a binder composition to produce a mixture, wherein the hydrophobizing agent comprises: about 30 wt % to about 98 wt % of the one or more fatty acid compounds; about 0.1 wt % to about 15 wt % of the one or more rosin acid compounds; and about 1 wt % to about 40 wt % of one or more unsaponifiable compounds; and at least partially curing the binder composition to produce a lignocellulose or fibrous based composite product.

2. A method for producing a lignocellulose or fibrous based composite product, comprising: contacting a plurality of lignocellulose or fibrous substrates with a hydrophobizing agent and a binder composition to produce a mixture, wherein the hydrophobizing agent comprises: about 30 wt % to about 98 wt % of the one or more fatty acid compounds; about 0.1 wt % to about 15 wt % of the one or more rosin acid compounds; and about 1 wt % to about 40 wt % of one or more unsaponifiable compounds; and at least partially curing the binder composition to produce a lignocellulose or fibrous based composite product.

3. A method for producing a lignocellulose or fibrous based composite product, comprising: combining or contacting a plurality of fibrous substrates, a hydrophobizing agent, and a binder composition to produce a mixture, wherein the hydrophobizing agent comprises: about 30 wt % to about 98 wt % of the one or more fatty acid compounds; about 0.1 wt % to about 15 wt % of the one or more rosin acid compounds; and about 1 wt % to about 40 wt % of one or more unsaponifiable compounds; and at least partially curing the binder composition to produce a fibrous based composite product.

4. The method of any one of paragraphs 1-3, wherein the lignocellulose or fibrous substrates are first combined or contacted with the hydrophobizing agent, and then combined or contacted with the binder composition to produce the mixture.

5. The method of any one of paragraphs 1-3, wherein the lignocellulose or fibrous substrates are first combined or contacted with the binder composition, and then combined or contacted with the hydrophobizing agent to produce the mixture.

6. The method of any one of paragraphs 1-3, wherein the lignocellulose or fibrous substrates, the hydrophobizing agent, and the binder composition are combined or contacted together at substantially the same time to produce the mixture.

7. The method of any one of paragraphs 1-3, wherein the mixture, formed by combining or contacting the lignocellulose or fibrous substrates with the hydrophobizing agent and the binder composition, is in a solid state, a liquid state, a wax form, a powder form, a solution, a suspension, one phase, or two phases.

8. The method of any one of paragraphs 1-3, wherein the one or more fatty acid compounds comprise fatty acids, fatty acid esters, fatty acid glycerides, fatty acid salts, or any mixture thereof.

9. The method of any one of paragraphs 1-3, wherein the hydrophobizing agent comprises a high acid value head composition, a low acid value head composition, a pitch composition, a rosin composition, acids thereof, acid esters thereof, acid glycerides thereof, acid salts thereof, or any mixture thereof.

10. The method of any one of paragraphs 1-3, wherein the hydrophobizing agent comprises two or more fatty acid compounds selected from the group consisting of palmitic acid, oleic acid, linoleic acid, stearic acid, capric acid, lauric acid, myristic acid, acids thereof, acid esters thereof, acid glycerides thereof, salts thereof, and any mixture thereof.

11. The method of any one of paragraphs 1-3, wherein the hydrophobizing agent comprises stearic acid, stearates, stearic acid triglycerides, hydrogenated castor oil, glyceryl trihydroxystearate, 12-hydroxystearic acid triglyceride, castor wax, acids thereof, salts thereof, or any mixture thereof.

12. The method of any one of paragraphs 1-3, wherein the one or more fatty acid compounds comprise: about 60 wt % to about 85 wt % of palmitic acid, palmitic acid esters, palmitic acid glycerides, palmitate or palmitic acid salts, or any mixture thereof; about 5 wt % to about 20 wt % of oleic acid, oleic acid esters, oleic acid glycerides, oleate or oleic acid salts, or any mixture thereof; about 1 wt % to about 10 wt % of linoleic acid, linoleic acid esters, linoleic acid glycerides, linoleate or linoleic acid salts, or any mixture thereof; and about 0.1 wt % to about 8 wt % of stearic acid, stearic acid esters, stearic acid glycerides, stearate or stearic acid salts, or any mixture thereof.

13. The method of any one of paragraphs 1-3, wherein the one or more fatty acid compounds comprise: about 65 wt % to about 80 wt % of palmitic acid; about 8 wt % to about 12 wt % of oleic acid; about 3 wt % to about 7 wt % of linoleic acid; and about 0.5 wt % to about 5 wt % of stearic acid.

14. The method of any one of paragraphs 1-3, wherein the one or more fatty acid compounds comprise: about 70 wt % to about 75 wt % of palmitic acid; about 9 wt % to about 11 wt % of oleic acid; about 5 wt % to about 6 wt % of linoleic acid; and about 0.5 wt % to about 3 wt % of stearic acid.

15. The method of any one of paragraphs 1-3, wherein the one or more fatty acid compounds comprise: about 60 wt % to about 85 wt % of palmitic acid, palmitic acid esters, palmitic acid glycerides, palmitate or palmitic acid salts, or any mixture thereof; about 5 wt % to about 20 wt % of oleic acid, oleic acid esters, oleic acid glycerides, oleate or oleic acid salts, or any mixture thereof; about 1 wt % to about 10 wt % of linoleic acid, linoleic acid esters, linoleic acid glycerides, linoleate or linoleic acid salts, or any mixture thereof; and about 0.1 wt % to about 8 wt % of stearic acid, stearic acid esters, stearic acid glycerides, stearate or stearic acid salts, or any mixture thereof.

16. The method of any one of paragraphs 1-3, wherein the one or more rosin acid compounds are selected from the group consisting of abietic acid, an abietic-type acid, pimaric acid, a pimaric-type acid, isomers thereof, and mixtures thereof.

17. The method of any one of paragraphs 1-3, wherein the lignocellulose composite product is substantially free of slack waxes.

18. The method of any one of paragraphs 1-3, wherein the lignocellulose composite product further comprises one or more slack waxes.

19. The method of any one of paragraphs 1-3, wherein the lignocellulose composite product further comprises one or more slack waxes, and the lignocellulose composite product has a concentration of about 0.1 wt % to about 5 wt % of the slack waxes, based on a dried weight of the lignocellulose or fibrous substrates.

20. The method of any one of paragraphs 1-3, wherein the hydrophobizing agent comprises one or more slack waxes, and the hydrophobizing agent has a concentration of about 25 wt % to about 75 wt % of the slack waxes, based on the weight of the hydrophobizing agent.

21. The method of any one of paragraphs 1-3, wherein the lignocellulose composite product comprises about 0.1 wt % to about 10 wt % of the hydrophobizing agent, based on a dried weight of the lignocellulose or fibrous substrates.

22. The method of any one of paragraphs 1-3, wherein the lignocellulose composite product comprises about 0.5 wt % to about 6 wt % of the hydrophobizing agent, based on a dried weight of the lignocellulose or fibrous substrates.

23. The method of any one of paragraphs 1-3, wherein the lignocellulose composite product comprises about 0.7 wt % to about 3.5 wt % of the hydrophobizing agent, based on a dried weight of the lignocellulose or fibrous substrates.

24. The method of any one of paragraphs 1-3, wherein the lignocellulose composite product comprises about 0.9 wt % to about 2.5 wt % of the hydrophobizing agent, based on a dried weight of the lignocellulose or fibrous substrates.

25. The method of any one of paragraphs 1-3, wherein the hydrophobizing agent comprises a high acid value head composition and comprises: about 70 wt % to about 95 wt % of the one or more fatty acid compounds; about 0.5 wt % to about 5 wt % of the one or more rosin acid compounds; and about 2 wt % to about 25 wt % of the one or more unsaponifiable compounds.

26. The method of any one of paragraphs 1-3, wherein the hydrophobizing agent comprises a high acid value head composition and comprises: about 75 wt % to about 90 wt % of the one or more fatty acid compounds; about 1 wt % to about 4 wt % of the one or more rosin acid compounds; and about 3 wt % to about 15 wt % of the one or more unsaponifiable compounds.

27. The method of any one of paragraphs 1-3, wherein the hydrophobizing agent comprises a high acid value head composition and comprises: about 80 wt % to about 85 wt % of the one or more fatty acid compounds; about 2 wt % to about 3 wt % of the one or more rosin acid compounds; and about 5 wt % to about 10 wt % of the one or more unsaponifiable compounds.

28. The method of any one of paragraphs 1-3, wherein the hydrophobizing agent comprises a high acid value head composition, and the high acid value head composition has an acid value of about 150 to about 200.

29. The method of any one of paragraphs 1-3, wherein the hydrophobizing agent comprises a high acid value head composition, and the high acid value head composition has an acid value of about 160 to about 190.

30. The method of any one of paragraphs 1-3, wherein the hydrophobizing agent comprises a high acid value head composition, and the high acid value head composition has an acid value of about 170 to about 180.

31. The method of any one of paragraphs 1-3, wherein the hydrophobizing agent comprises a high acid value head composition, and the hydrophobizing agent comprises a high acid value head composition, and the high acid value head composition has a softening point of about 35° C. to about 55° C.

32. The method of any one of paragraphs 1-3, wherein the hydrophobizing agent comprises a high acid value head composition, and the high acid value head composition has a softening point of about 30° C. to about 60° C.

33. The method of any one of paragraphs 1-3, wherein the hydrophobizing agent comprises a high acid value head composition, and the high acid value head composition has a softening point of about 35° C. to about 55° C.

34. The method of any one of paragraphs 1-3, wherein the hydrophobizing agent comprises a high acid value head composition, and the high acid value head composition has a softening point of about 40° C. to about 50° C.

35. The method of any one of paragraphs 1-3, wherein the hydrophobizing agent comprises a high acid value head composition, and the high acid value head composition has an acid value of about 150 to about 200 and a softening point of about 35° C. to about 55° C.

36. The method of any one of paragraphs 1-3, wherein the hydrophobizing agent comprises a low acid value head composition and comprises: about 30 wt % to about 90 wt % of the one or more fatty acid compounds; about 0.2 wt % to about 10 wt % of the one or more rosin acid compounds; and about 5 wt % to about 35 wt % of the one or more unsaponifiable compounds.

37. The method of any one of paragraphs 1-3, wherein the hydrophobizing agent comprises a low acid value head composition and comprises: about 50 wt % to about 75 wt % of the one or more fatty acid compounds; about 0.5 wt % to about 5 wt % of the one or more rosin acid compounds; and about 10 wt % to about 25 wt % of the one or more unsaponifiable compounds.

38. The method of any one of paragraphs 1-3, wherein the hydrophobizing agent comprises a low acid value head composition and comprises: about 60 wt % to about 65 wt % of the one or more fatty acid compounds; about 1 wt % to about 2 wt % of the one or more rosin acid compounds; and about 15 wt % to about 20 wt % of the one or more unsaponifiable compounds.

39. The method of any one of paragraphs 1-3, wherein the hydrophobizing agent comprises a low acid value head composition, and the low acid value head composition has an acid value of about 80 to about 150.

40. The method of any one of paragraphs 1-3, wherein the hydrophobizing agent comprises a low acid value head composition, and the low acid value head composition has an acid value of about 90 to about 140.

41. The method of any one of paragraphs 1-3, wherein the hydrophobizing agent comprises a low acid value head composition, and the low acid value head composition has an acid value of about 100 to about 130.

42. The method of any one of paragraphs 1-3, wherein the hydrophobizing agent comprises a low acid value head composition, and the low acid value head composition has a softening point of about 35° C. to about 55° C.

43. The method of any one of paragraphs 1-3, wherein the hydrophobizing agent comprises a low acid value head composition, and the low acid value head composition has a softening point of about 30° C. to about 60° C.

44. The method of any one of paragraphs 1-3, wherein the hydrophobizing agent comprises a low acid value head composition, and the low acid value head composition has a softening point of about 35° C. to about 55° C., as measured according to ASTM D6090-12.

45. The method of any one of paragraphs 1-3, wherein the hydrophobizing agent comprises a low acid value head composition, and the low acid value head composition has a softening point of about 40° C. to about 50° C., as measured according to ASTM D6090-12.

46. The method of any one of paragraphs 1-3, wherein the hydrophobizing agent comprises a low acid value head composition, the low acid value head composition has an acid value of about 80 to about 150, and the low acid value head composition has a softening point of about 35° C. to about 55° C., as measured according to ASTM D6090-12.

47. The method of any one of paragraphs 1-3, wherein the lignocellulose composite product has a water absorption of about 50 wt % or less and a thickness swelling of about 15 wt % or less, as measured according to the Water Absorption and Thickness Swelling Test under ASTM D1037-96a.

48. The method of any one of paragraphs 1-3, wherein the lignocellulose composite product has a water absorption of about 20 wt % or less and a thickness swelling of less than 5%, as measured according to the Water Absorption and Thickness Swelling Test under ASTM D1037-96a.

49. The method of any one of paragraphs 1-3, wherein the lignocellulose composite product has a density of about 0.48 g/cm$^3$ (about 30 lbs/ft$^3$) to about 0.96 g/cm$^3$ (about 60 lbs/ft$^3$).

50. The method of any one of paragraphs 1-3, further comprising forming the mixture into a mat before at least partially curing the binder composition.

51. The method of paragraph 50, further comprising pressing and heating the mat when at least partially curing the binder composition to produce the lignocellulose composite product.

52. The method of paragraph 51, wherein the mat is heated to a temperature of about 138° C. to about 250° C.

53. The method of paragraph 51, wherein the mat is heated for about 5 seconds to about 30 seconds.

54. The method of paragraph 51, wherein the mat is heated for about 30 seconds to about 2 minutes.

55. The method of paragraph 51, wherein the mat is heated for about 2 minutes to about 6 minutes.

56. The method of any one of paragraphs 1-3, wherein the lignocellulose composite product comprises about 0.5 wt % to about 15 wt % of the binder composition, based on a dried weight of the lignocellulose or fibrous substrates.

57. The method of any one of paragraphs 1-3, wherein the lignocellulose composite product comprises about 0.6 wt % to about 12 wt % of the binder composition, based on a dried weight of the lignocellulose or fibrous substrates.

58. The method of any one of paragraphs 1-3, wherein the lignocellulose composite product comprises about 0.7 wt % to about 10 wt % of the binder composition, based on a dried weight of the lignocellulose or fibrous substrates.

59. The method of any one of paragraphs 1-3, wherein the lignocellulose composite product comprises about 0.8 wt % to about 9 wt % of the binder composition, based on a dried weight of the lignocellulose or fibrous substrates.

60. The method of any one of paragraphs 1-3, wherein the lignocellulose composite product comprises about 1 wt % to about 8 wt % of the binder composition, based on a dried weight of the lignocellulose or fibrous substrates.

61. The method of any one of paragraphs 1-3, wherein the lignocellulose composite product is an orientated strand board (OSB), a particleboard, a high density fiberboard (HDF), a medium density fiberboard (MDF), or a low density fiberboard (LDF).

62. The method of any one of paragraphs 1-3, wherein the lignocellulose or fibrous substrates comprise softwood, hardwood, or a mixture thereof.

63. The method of any one of paragraphs 1-3, wherein the binder composition comprises melamine formaldehyde (MF), urea formaldehyde (UF), phenol formaldehyde (PF), melamine urea formaldehyde (MUF), phenol melamine urea formaldehyde (PMUF), resorcinol formaldehyde (RF), phenol resorcinol formaldehyde (PRF), methylene diphenyl diisocyanate (MDI), polymeric methylene diphenyl diisocyanate (pMDI), polyurethane (PU), polyamide-epihalohydrin (PAE), styrene maleic anhydride (SMA), cationic styrene maleimide (SMI), emulsified polymer isocyanate (EPI) adhesives, combinations thereof, or any mixture thereof.

64. The method of any one of paragraphs 1-3, wherein the hydrophobizing agent comprises a high acid value head composition and comprises: about 70 wt % to about 95 wt % of the one or more fatty acid compounds; about 0.5 wt % to about 5 wt % of the one or more rosin acid compounds; and about 2 wt % to about 25 wt % of the one or more unsaponifiable compounds; wherein the hydrophobizing agent comprises a high acid value head composition, and the high acid value head composition has an acid value of about 150 to about 200 and a softening point of about 35° C. to about 55° C., as measured according to ASTM D6090-12; wherein the one or more fatty acid compounds comprise: about 60 wt % to about 85 wt % of palmitic acid, palmitic acid esters, palmitic acid glycerides, palmitate or palmitic acid salts, or any mixture thereof; about 5 wt % to about 20 wt % of oleic acid, oleic acid esters, oleic acid glycerides, oleate or oleic acid salts, or any mixture thereof; about 1 wt % to about 10 wt % of linoleic acid, linoleic acid esters, linoleic acid glycerides, linoleate or linoleic acid salts, or any mixture thereof; and about 0.1 wt % to about 8 wt % of stearic acid, stearic acid esters, stearic acid glycerides, stearate or stearic acid salts, or any mixture thereof; and wherein the one or more rosin acid compounds are selected from the group consisting of abietic acid, an abietic-type acid, pimaric acid, a pimaric-type acid, isomers thereof, and mixtures thereof.

65. A lignocellulose or fibrous based composite product, comprising: a plurality of lignocellulose or fibrous substrates; an at least partially cured binder composition; and a hydrophobizing agent comprising: about 30 wt % to about 98 wt % of the one or more fatty acid compounds; about 0.1 wt % to about 15 wt % of the one or more rosin acid compounds; and about 1 wt % to about 40 wt % of one or more unsaponifiable compounds.

66. The composite product of paragraph 65, wherein prior to curing the cured binder composition, the uncured binder composition comprises: an aldehyde-based resin; and a copolymer comprising one or more unsaturated carboxylic acids, one or more unsaturated carboxylic anhydrides, or a combination thereof, and one or more vinyl aromatic derived units.

67. The composite product of paragraph 65, wherein the hydrophobizing agent comprises a high acid value head composition, a low acid value head composition, a pitch composition, a rosin composition, acids thereof, acid esters thereof, acid glycerides thereof, acid salts thereof, or any mixture thereof.

68. The composite product of paragraph 65, wherein the hydrophobizing agent comprises two or more fatty acid compounds selected from the group consisting of palmitic acid, oleic acid, linoleic acid, stearic acid, capric acid, lauric acid, myristic acid, acids thereof, acid esters thereof, acid glycerides thereof, salts thereof, and any mixture thereof.

69. The composite product of paragraph 65, wherein the hydrophobizing agent comprises stearic acid, stearates, stearic acid triglycerides, hydrogenated castor oil, glyceryl trihydroxystearate, 12-hydroxystearic acid triglyceride, castor wax, acids thereof, salts thereof, or any mixture thereof.

70. The composite product of paragraph 65, wherein the one or more fatty acid compounds comprise: about 60 wt % to about 85 wt % of palmitic acid; about 5 wt % to about 20 wt % of oleic acid; about 1 wt % to about 10 wt % of linoleic acid; and about 0.1 wt % to about 8 wt % of stearic acid.

71. The composite product of paragraph 65, wherein the lignocellulose composite product is substantially free of slack waxes.

72. The composite product of paragraph 65, wherein the lignocellulose composite product further comprises one or more slack waxes.

73. The composite product of paragraph 65, wherein the lignocellulose composite product further comprises one or more slack waxes, and the lignocellulose composite product has a concentration of about 0.1 wt % to about 5 wt % of the slack waxes, based on a dried weight of the lignocellulose or fibrous substrates.

74. The composite product of paragraph 65, wherein the hydrophobizing agent comprises one or more slack waxes, and the hydrophobizing agent has a concentration of about 25 wt % to about 75 wt % of the slack waxes, based on the weight of the hydrophobizing agent.

75. The composite product of paragraph 65, wherein the at least partially cured binder composition comprises melamine formaldehyde (MF), urea formaldehyde (UF), phenol formaldehyde (PF), melamine urea formaldehyde (MUF), resorcinol formaldehyde (RF), methylene diphenyl diisocyanate (MDI), polymeric methylene diphenyl diisocyanate (pMDI), polyurethane (PU), polyamide-epihalohydrin (PAE), styrene maleic anhydride (SMA), cationic styrene maleimide (SMI), emulsified polymer isocyanate (EPI) adhesives, or any mixture thereof.

76. The composite product of paragraph 65, wherein the lignocellulose or fibrous substrates comprise softwood, hardwood, or a mixture thereof.

77. A method for producing a lignocellulose or fibrous based composite product, comprising: contacting a plurality of lignocellulose or fibrous substrates with a hydrophobizing agent and a binder composition to produce a mixture; and at least partially curing the binder composition to produce a lignocellulose or fibrous based composite product, wherein the hydrophobizing agent comprises: about 30 wt % to about 98 wt % of the one or more fatty acid compounds; about 0.1 wt % to about 15 wt % of the one or more rosin acid compounds; and about 1 wt % to about 40 wt % of one or more unsaponifiable compounds; wherein the binder composition comprises: an aldehyde-based resin; and a copolymer comprising one or more unsaturated carboxylic acids, one or more unsaturated carboxylic anhydrides, or a combination thereof, and one or more vinyl aromatic derived units.

78. The method of paragraph 77, wherein the aldehyde-based resin comprises a urea-aldehyde resin, a melamine-aldehyde resin, a phenol-aldehyde resin, a resorcinol-aldehyde resin, a phenol-resorcinol-aldehyde resin, a melamine-urea-aldehyde resin, a phenol-melamine-urea-aldehyde resin, a phenol-urea-aldehyde-resin, or any combination thereof.

79. A method for producing a lignocellulose or fibrous based composite product, comprising: combining a plurality of lignocellulose or fibrous substrates, one or more hydrophobizing agents, and one or more free radical precursors to produce a mixture, wherein the hydrophobizing agent comprises: about 30 wt % to about 98 wt % of the one or more fatty acid compounds; about 0.1 wt % to about 15 wt % of the one or more rosin acid compounds; and about 1 wt % to about 40 wt % of one or more unsaponifiable compounds; and at least partially curing the mixture to produce a lignocellulose or fibrous based composite product.

80. The method of paragraph 79, wherein the one or more free radical precursors comprise a mixture of hydrogen peroxide and one or more iron-containing catalysts.

81. A lignocellulose composite product, comprising: a plurality of lignocellulose substrates; an at least partially cured binder composition; and a hydrophobizing agent comprising: about 30 wt % to about 98 wt % of a fatty acid compound; about 0.1 wt % to about 15 wt % of a rosin acid compound; and about 1 wt % to about 40 wt % of an unsaponifiable compound.

82. The lignocellulose composite product according to paragraph 81, wherein the binder composition comprises an at least partially cured polymeric material comprising a melamine-formaldehyde resin, a urea-formaldehyde resin, a phenol-formaldehyde resin, a melamine-urea-formaldehyde resin, a phenol-melamine-urea-formaldehyde resin, a resorcinol-formaldehyde resin, a phenol-resorcinol formaldehyde resin, a methylene diphenyl diisocyanate, a polymeric methylene diphenyl diisocyanate, a polyurethane, a polyamide-epihalohydrin resin, a styrene maleic anhydride, a cationic styrene maleimide, an emulsified polymer isocyanate adhesive, or any mixture thereof.

83. The lignocellulose composite product according to paragraph 81 or 82, wherein the hydrophobizing agent comprises a high acid value head composition having an acid value of 150 to 200, a low acid value head composition having an acid value of 80 to less than 150, a pitch composition, a rosin composition, acids thereof, acid esters thereof, acid glycerides thereof, acid salts thereof, or any mixture thereof.

84. The lignocellulose composite product according to any one of paragraphs 81 to 83, wherein the fatty acid compound comprises: about 60 wt % to about 85 wt % of palmitic acid, palmitic acid esters, palmitic acid glycerides, palmitate or palmitic acid salts, or any mixture thereof; about 5 wt % to about 20 wt % of oleic acid, oleic acid esters, oleic acid glycerides, oleate or oleic acid salts, or any mixture thereof; about 1 wt % to about 10 wt % of linoleic acid, linoleic acid esters, linoleic acid glycerides, linoleate or linoleic acid salts, or any mixture thereof; and about 0.1 wt % to about 8 wt % of stearic acid, stearic acid esters, stearic acid glycerides, stearate or stearic acid salts, or any mixture thereof.

85. The lignocellulose composite product according to any one of paragraphs 81 to 84, wherein the lignocellulose composite product comprises about 1 wt % to about 10 wt % of the binder composition, based on a dried weight of the plurality of lignocellulose substrates.

86. The lignocellulose composite product according to any one of paragraphs 81 to 85, wherein the lignocellulose composite product comprises about 0.1 wt % to about 5 wt % of the hydrophobizing agent, based on a dried weight of the plurality of lignocellulose substrates.

87. The lignocellulose composite product according to any one of paragraphs 81 to 86, wherein the fatty acid compound comprises one or more fatty acids, one or more fatty acid esters, one or more fatty acid glycerides, one or more fatty acid salts, or any mixture thereof.

88. The lignocellulose composite product according to any one of paragraphs 81 to 87, wherein the lignocellulose based composite product is comprises less than 1 wt % of slack wax.

89. The lignocellulose composite product according to any one of paragraphs 81 to 88, wherein the hydrophobizing agent comprises a high acid value head composition having an acid value of 150 to about 200 and comprises: about 70 wt % to about 95 wt % of the fatty acid compound; about 0.5 wt % to about 5 wt % of the rosin acid compound; and about 2 wt % to about 25 wt % of the unsaponifiable compounds.

90. The lignocellulose composite product according to any one of paragraphs 81 to 89, wherein the hydrophobizing agent comprises a high acid value head composition having an acid value of 150 to about 200 and a softening point of about 35° C. to about 55° C., as measured according to ASTM D6090-12.

91. The lignocellulose composite product according to any one of paragraphs 81 to 90, wherein the hydrophobizing agent comprises a low acid value head composition having an acid value of about 80 to less than 150 and comprises: about 30 wt % to about 90 wt % of the fatty acid compound; about 0.2 wt % to about 10 wt % of the rosin acid compound; and about 5 wt % to about 35 wt % of the unsaponifiable compound.

92. The lignocellulose composite product according to any one of paragraphs 81 to 91, wherein the hydrophobizing agent comprises a low acid value head composition having an acid value of about 80 to less than 150 and a softening point of about 35° C. to about 55° C., as measured according to ASTM D6090-12.

93. The lignocellulose composite product according to any one of paragraphs 81 to 92, wherein the lignocellulose based composite product has a water absorption of about 50 wt % or less and a thickness swelling of about 15 wt % or less, as measured according to the Water Absorption and Thickness Swelling Test under ASTM D1037-96a.

94. A lignocellulose composite product comprising: a plurality of lignocellulose substrates; about 1 wt % to about 10 wt % of an at least partially cured binder composition, based on a dried weight of the plurality of lignocellulose; about 0.1 wt % to about 5 wt % of a hydrophobizing agent, based on the dried weight of the plurality of lignocellulose substrates; and less than 1 wt % of a slack wax, based on the dried weight of the lignocellulose composite products, wherein: the binder composition comprises an at least partially cured melamine-formaldehyde resin, urea-formaldehyde resin, phenol-formaldehyde resin, melamine-urea-formaldehyde resin, phenol-melamine-urea-formaldehyde resin, resorcinol-formaldehyde resin, phenol-resorcinol formaldehyde resin, or any mixture thereof, and the hydrophobizing agent comprises about 30 wt % to about 98 wt % of a fatty acid compound, about 0.1 wt % to about 15 wt % of a rosin acid compound, and about 1 wt % to about 40 wt % of an unsaponifiable compound.

95. The lignocellulose composite product according to paragraph 94, wherein the hydrophobizing agent comprises a high acid value head composition having an acid value of 150 to about 200, a low acid value head composition having an acid value of about 80 to less than 150, a pitch composition, a rosin composition, acids thereof, acid esters thereof, acid glycerides thereof, acid salts thereof, or any mixture thereof.

96. A lignocellulose composite product, comprising: a plurality of lignocellulose substrates; an at least partially cured binder composition; and a hydrophobizing agent comprising a pitch and a fatty acid composition.

97. The lignocellulose composite product according to paragraph 96, wherein the pitch comprises a tall oil pitch, a coal tar pitch, a heavy crude oil, a heavy petroleum distillate, a Fischer-Tropsch product, an asphalt (bitumen), or any mixture thereof.

98. The lignocellulose composite product according to paragraph 96 or 97, wherein the pitch comprises a tall oil pitch.

99. The lignocellulose composite product according to any one of paragraphs 96 to 98, wherein the fatty acid composition comprises tall oil fatty acids, distilled tall oil fatty acids, crude tall oil, or any mixture thereof.

100. The lignocellulose composite product according to any one of paragraphs 96 to 99, wherein: the tall oil pitch comprises about 5 wt % to about 40 wt % of fatty acids, esters of fatty acids, or a mixture thereof, about 5 wt % to about 30 wt % of rosin acids, esters of rosin acids, or a mixture thereof, and about 30 wt % to about 90 wt % of unsaponifiable compounds, and the fatty acid composition comprises about 55 wt % to about 95 wt % of fatty acids, about 1 wt % to about 45 wt % of rosin acids, and less than 5 wt % of unsaponifiable compounds, based on a combined weight of the fatty acids, the rosin acids, and the unsaponifiable compounds.

101. The lignocellulose composite product according to any one of paragraphs 96 to 100, wherein the at least partially cured binder composition comprises an at least partially cured polymeric material comprising a melamine-formaldehyde resin, a urea-formaldehyde resin, a phenol-formaldehyde resin, a melamine-urea-formaldehyde resin, a phenol-melamine-urea-formaldehyde resin, a resorcinol-formaldehyde resin, a phenol-resorcinol formaldehyde resin, a methylene diphenyl diisocyanate, a polymeric methylene diphenyl diisocyanate, a polyurethane, a polyamide-epihalohydrin resin, a styrene maleic anhydride, a cationic styrene maleimide, an emulsified polymer isocyanate adhesive, or any mixture thereof.

102. The lignocellulose composite product according to any one of paragraphs 96 to 101, wherein the at least partially cured binder composition comprises an at least partially cured melamine-formaldehyde resin, urea-formaldehyde resin, phenol-formaldehyde resin, melamine-urea-formaldehyde resin, phenol-melamine-urea-formaldehyde resin, resorcinol-formaldehyde resin, phenol-resorcinol formaldehyde resin, or any mixture thereof.

103. The lignocellulose composite product according to any one of paragraphs 96 to 102, wherein: the hydrophobizing agent comprises about 60 wt % to about 90 wt % of the tall oil pitch, based on a combined weight of the tall oil pitch and the fatty acid composition, and the binder composition comprises an at least partially cured melamine-formaldehyde resin, urea-formaldehyde resin, phenol-formaldehyde resin, melamine-urea-formaldehyde resin, phenol-melamine-urea-formaldehyde resin, resorcinol-formaldehyde resin, phenol-resorcinol formaldehyde resin, or any mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:

1. A lignocellulose composite product, comprising:
   a plurality of lignocellulose substrates;
   an at least partially cured binder composition; and
   a hydrophobizing agent comprising:
      about 70 wt % to about 98 wt % of a fatty acid compound, based on a total weight of the hydrophobizing agent;
      about 0.1 wt % to about 15 wt % of a rosin acid compound, based on the total weight of the hydrophobizing agent; and
      about 1 wt % to about 40 wt % of an unsaponifiable compound, based on the total weight of the hydrophobizing agent.

2. The lignocellulose composite product of claim 1, wherein the at least partially cured binder composition comprises an at least partially cured polymeric material comprising a melamine-formaldehyde resin, a urea-formaldehyde resin, a phenol-formaldehyde resin, a melamine-urea-formaldehyde resin, a phenol-melamine-urea-formaldehyde resin, a resorcinol-formaldehyde resin, a phenol-resorcinol formaldehyde resin, a methylene diphenyl diisocyanate, a polymeric methylene diphenyl diisocyanate, a polyurethane, a polyamide-epihalohydrin resin, a styrene maleic anhydride, a cationic styrene maleimide, an emulsified polymer isocyanate adhesive, or any mixture thereof.

3. The lignocellulose composite product of claim 1, wherein the hydrophobizing agent has an acid value of 150 to 200.

4. The lignocellulose composite product of claim 1, wherein the fatty acid compound comprises palmitic acid, oleic acid, linoleic acid, stearic acid, or a mixture thereof.

5. The lignocellulose composite product of claim 1, wherein the lignocellulose composite product comprises about 1 wt % to about 10 wt % of the binder composition, based on a dried weight of the plurality of lignocellulose substrates, and wherein the unsaponifiable compound comprises sterols, high-molecular weight alcohols, or a mixture thereof.

6. The lignocellulose composite product of claim 1, wherein the lignocellulose composite product comprises about 0.1 wt % to about 5 wt % of the hydrophobizing agent, based on a dried weight of the plurality of lignocellulose substrates.

7. The lignocellulose composite product of claim 1, wherein the fatty acid compound comprises one or more fatty acids, one or more fatty acid esters, one or more fatty acid glycerides, one or more fatty acid salts, or any mixture thereof.

8. The lignocellulose composite product of claim 1, wherein the lignocellulose based composite product is comprises less than 1 wt % of slack wax, based on a dried weight of the lignocellulose composite products.

9. The lignocellulose composite product of claim 1, wherein the hydrophobizing agent comprises a high acid value head composition having an acid value of 150 to about 200 and comprises:
   about 70 wt % to about 95 wt % of the fatty acid compound, based on the total weight of the hydrophobizing agent;
   about 0.5 wt % to about 5 wt % of the rosin acid compound, based on the total weight of the hydrophobizing agent; and about 2 wt % to about 25 wt % of the unsaponifiable compounds, based on the total weight of the hydrophobizing agent.

10. The lignocellulose composite product of claim 1, wherein the hydrophobizing agent comprises a high acid value head composition having an acid value of 150 to about 200 and a softening point of about 35° C. to about 55° C., as measured according to ASTM D6090-12.

11. The lignocellulose composite product of claim 1, wherein the hydrophobizing agent comprises:
about 75 wt % to about 90 wt % of the fatty acid compound, based on the total weight of the hydrophobizing agent;
about 1 wt % to 4 wt % of the rosin acid compound, based on the total weight of the hydrophobizing agent; and
about 3 wt % to about 15 wt % of the unsaponifiable compound, based on the total weight of the hydrophobizing agent.

12. The lignocellulose composite product of claim 1, wherein the lignocellulose composite product comprises about 1 wt % to about 10 wt % of the binder composition, based on a dried weight of the plurality of lignocellulose substrates, and wherein the lignocellulose composite product comprises about 0.1 wt % to about 5 wt % of the hydrophobizing agent, based on a dried weight of the plurality of lignocellulose substrates.

13. The lignocellulose composite product of claim 1, wherein the lignocellulose based composite product has a water absorption of about 50 wt % or less and a thickness swelling of about 15 wt % or less, as measured according to the Water Absorption and Thickness Swelling Test under ASTM D1037-96a.

14. A lignocellulose composite product comprising:
a plurality of lignocellulose substrates;
about 1 wt % to about 10 wt % of an at least partially cured binder composition, based on a dried weight of the plurality of lignocellulose substrates;
about 0.1 wt % to about 5 wt % of a hydrophobizing agent, based on the dried weight of the plurality of lignocellulose substrates; and
less than 1 wt % of a slack wax, based on the dried weight of the lignocellulose composite product, wherein:
the binder composition comprises an at least partially cured melamine-formaldehyde resin, urea-formaldehyde resin, phenol-formaldehyde resin, melamine-urea-formaldehyde resin, phenol-melamine-urea-formaldehyde resin, resorcinol-formaldehyde resin, phenol-resorcinol formaldehyde resin, or any mixture thereof, and
the hydrophobizing agent comprises about 70 wt % to about 98 wt % of a fatty acid compound, based on a total weight of the hydrophobizing agent, about 0.1 wt % to about 15 wt % of a rosin acid compound, based on the total weight of the hydrophobizing agent, and about 1 wt % to about 40 wt % of an unsaponifiable compound, based on the total weight of the hydrophobizing agent.

15. A lignocellulose composite product, comprising:
a plurality of lignocellulose substrates;
about 1 wt % to about 10 wt % of an at least partially cured binder composition, based on a dried weight of the plurality of lignocellulose substrates, wherein the binder composition comprises an at least partially cured melamine-formaldehyde resin, urea-formaldehyde resin, phenol-formaldehyde resin, melamine-urea-formaldehyde resin, phenol-melamine-urea-formaldehyde resin, resorcinol-formaldehyde resin, phenol-resorcinol formaldehyde resin, or any mixture thereof; and
about 0.1 wt % to about 5 wt % of a hydrophobizing agent, based on a dried weight of the plurality of lignocellulose substrates, the hydrophobizing agent comprising:
about 70 wt % to about 98 wt % of a fatty acid compound, based on a total weight of the hydrophobizing agent;
about 0.5 wt % to about 5 wt % of a rosin acid compound, based on the total weight of the hydrophobizing agent; and
about 2 wt % to about 25 wt % of an unsaponifiable compound, based on the total weight of the hydrophobizing agent.

16. The lignocellulose composite product of claim 15, wherein the hydrophobizing agent has an acid value of 150 to 200.

17. The lignocellulose composite product of claim 15, wherein the hydrophobizing agent comprises:
about 75 wt % to about 90 wt % of the fatty acid compound, based on the total weight of the hydrophobizing agent;
about 1 wt % to about 4 wt % of the rosin acid compound, based on the total weight of the hydrophobizing agent; and
about 3 wt % to about 15 wt % of the unsaponifiable compound, based on the total weight of the hydrophobizing agent.

18. The lignocellulose composite product of claim 9, wherein:
the at least partially cured binder composition comprises an at least partially cured phenol-formaldehyde resin,
the lignocellulose composite product comprises about 1 wt % to about 10 wt % of the at least partially cured binder composition, based on a dried weight of the plurality of lignocellulose, and
the lignocellulose composite product comprises about 0.1 wt % to about 5 wt % of the hydrophobizing agent, based on the dried weight of the plurality of lignocellulose substrates.

19. The lignocellulose composite product of claim 15, wherein:
the hydrophobizing agent comprises about 75 wt % to about 90 wt % of the fatty acid compound, based on a total weight of the hydrophobizing agent, and
the at least partially cured binder composition comprises the at least partially cured urea-formaldehyde resin, phenol-formaldehyde resin, or a mixture thereof.

20. The lignocellulose composite product of claim 1, wherein the hydrophobizing agent is derived from crude tall oil.

* * * * *